(12) United States Patent
Jung et al.

(10) Patent No.: US 9,521,370 B2
(45) Date of Patent: Dec. 13, 2016

(54) LEVEL-TWO DECRYPTION ASSOCIATED WITH INDIVIDUAL PRIVACY AND PUBLIC SAFETY PROTECTION VIA DOUBLE ENCRYPTED LOCK BOX

(71) Applicant: Elwha LLC, Bellevue, WA (US)

(72) Inventors: Edward K. Y. Jung, Bellevue, WA (US); Royce A. Levien, Lexington, MA (US); Richard T. Lord, Tacoma, WA (US); Robert W. Lord, Seattle, WA (US); Mark A. Malamud, Seattle, WA (US)

(73) Assignee: Elwha, LLC, Bellevue, WA (US)

( * ) Notice: Subject to any disclaimer, the term of this patent is extended or adjusted under 35 U.S.C. 154(b) by 0 days.

(21) Appl. No.: 13/731,751

(22) Filed: Dec. 31, 2012

(65) Prior Publication Data

US 2014/0185804 A1 Jul. 3, 2014

Related U.S. Application Data

(63) Continuation-in-part of application No. 13/720,360, filed on Dec. 19, 2012, which is a continuation-in-part of application No. 13/707,427, filed on Dec. 6, 2012, which is a continuation-in-part of application No. 13/660,848, filed on Oct. 25, 2012, now Pat. No. 9,042,546, which is a continuation-in-part of
(Continued)

(51) Int. Cl.
*H04N 7/167* (2011.01)
*H04L 9/08* (2006.01)
*H04L 9/14* (2006.01)

(52) U.S. Cl.
CPC ............ *H04N 7/1675* (2013.01); *H04L 9/088* (2013.01); *H04L 9/0861* (2013.01); *H04L 9/14* (2013.01)

(58) Field of Classification Search
CPC ...... H04L 9/0833; H04L 9/0861; H04L 9/008; H04L 9/14; H04N 7/1675
USPC .................................. 713/150; 380/210, 236
See application file for complete search history.

(56) References Cited

U.S. PATENT DOCUMENTS

| 5,761,311 A | 6/1998 | Spelman et al. |
| 6,912,514 B2 | 6/2005 | Matsushima et al. |

(Continued)

FOREIGN PATENT DOCUMENTS

| WO | WO 2006/070249 A1 | 7/2006 |
| WO | WO 2010/126644 A2 | 11/2010 |

OTHER PUBLICATIONS

Troncoso-Pastoriza et al.; "Videosurveillance and privacy: covering the two sides of the mirror with DRM"; DRM '09; Nov. 6, 2009; 12 pages; ACM.

(Continued)

*Primary Examiner* — Kambiz Zand
*Assistant Examiner* — Benjamin Kaplan

(57) ABSTRACT

Systems and/or processes related but not limited to a machine configured to create a physical reality of receiving a level-one encrypted output of a surveillance device; a machine configured to create a physical reality of decrypting at least a part of the level-one encrypted output of the surveillance device with a level-one decryption key that is practicably inaccessible by a level-one encryption entity; and a machine configured to create a physical reality of transmitting a plaintext output of the surveillance device. Other machines/processes are also disclosed/claimed.

18 Claims, 55 Drawing Sheets

Related U.S. Application Data application No. 13/653,222, filed on Oct. 16, 2012, which is a continuation-in-part of application No. 13/385,598, filed on Jul. 12, 2012, now Pat. No. 8,885,824.

(56) References Cited

U.S. PATENT DOCUMENTS

| | | | |
|---|---|---|---|
| 7,120,252 | B1 | 10/2006 | Jones et al. |
| 7,190,882 | B2 | 3/2007 | Gammenthaler |
| 7,508,941 | B1 | 3/2009 | O'Toole, Jr. et al. |
| 7,512,814 | B2 | 3/2009 | Chen et al. |
| 7,549,044 | B2 | 6/2009 | Lee et al. |
| 7,802,723 | B2 | 9/2010 | Petrone et al. |
| 7,822,635 | B1 | 10/2010 | Brown et al. |
| 7,921,450 | B1 | 4/2011 | Vainstein et al. |
| 8,359,392 | B2 | 1/2013 | Garbajs et al. |
| 8,666,110 | B2 | 3/2014 | Yoo et al. |
| 2002/0062451 | A1 | 5/2002 | Scheidt et al. |
| 2002/0131768 | A1 | 9/2002 | Gammenthaler |
| 2002/0138439 | A1 | 9/2002 | Matsushima et al. |
| 2003/0065927 | A1 | 4/2003 | Penner |
| 2003/0085998 | A1 | 5/2003 | Ramirez-Diaz et al. |
| 2003/0115147 | A1 | 6/2003 | Feldman et al. |
| 2004/0153648 | A1 | 8/2004 | Rotholtz et al. |
| 2004/0223614 | A1 | 11/2004 | Seaman |
| 2005/0091491 | A1 | 4/2005 | Lee et al. |
| 2005/0111701 | A1 | 5/2005 | Seki et al. |
| 2005/0182948 | A1 | 8/2005 | Ducharme |
| 2006/0020821 | A1 | 1/2006 | Waltermann et al. |
| 2006/0029228 | A1 | 2/2006 | Lagrange et al. |
| 2006/0101285 | A1 | 5/2006 | Chen et al. |
| 2006/0185023 | A1 | 8/2006 | Sato et al. |
| 2006/0282901 | A1 | 12/2006 | Li et al. |
| 2007/0198839 | A1 | 8/2007 | Carle et al. |
| 2007/0297603 | A1 | 12/2007 | Kamins et al. |
| 2007/0297607 | A1 | 12/2007 | Ogura et al. |
| 2009/0158030 | A1 | 6/2009 | Rasti |
| 2009/0259560 | A1 | 10/2009 | Bachenheimer |
| 2010/0180291 | A1 | 7/2010 | Kahn et al. |
| 2011/0103582 | A1 | 5/2011 | Kamins et al. |
| 2012/0030466 | A1 | 2/2012 | Yamaguchi |
| 2012/0036364 | A1 | 2/2012 | Yoneda et al. |
| 2012/0054485 | A1 | 3/2012 | Tanaka et al. |
| 2012/0108209 | A1 | 5/2012 | Sun |
| 2012/0144208 | A1 | 6/2012 | Kim et al. |
| 2012/0204032 | A1 | 8/2012 | Wilkins et al. |
| 2012/0246075 | A1 | 9/2012 | Rasti |
| 2012/0260094 | A1 | 10/2012 | Asim et al. |
| 2012/0307049 | A1 | 12/2012 | Mimar |
| 2012/0323750 | A1* | 12/2012 | Sivaramakrishnan et al. . 705/34 |
| 2013/0004090 | A1 | 1/2013 | Kundu et al. |
| 2013/0007449 | A1* | 1/2013 | Rangsikitpho et al. ...... 713/168 |
| 2013/0198829 | A1 | 8/2013 | Bund et al. |
| 2014/0157429 | A1 | 6/2014 | Kinoshita et al. |

OTHER PUBLICATIONS

U.S. Appl. No. 13/653,222, Edward K.Y. Jung et al.
U.S. Appl. No. 13/660,848, Edward K.Y. Jung et al.
U.S. Appl. No. 13/664,265, Edward K.Y. Jung et al.
U.S. Appl. No. 13/707,427, Edward K.Y. Jung et al.
U.S. Appl. No. 13/708,651, Edward K.Y. Jung et al.
U.S. Appl. No. 13/720,360, Edward K.Y. Jung et al.
U.S. Appl. No. 13/724,941, Edward K.Y. Jung et al.
Bai et al.; "An Advanced Efficient Secured Blind Authentication and Verification Crypto Protocol"; International Journal of Future Generation Communication and Networking; bearing a date of Sep. 2011; pp. 87-94; vol. 4, No. 3; located at www.sersc.org/journals/IJFGCN/vol4_no3/8.pdf.

Camenisch et al.; Blind and Anonymous Identity-Based Encryption and Authorised Private Searches on Public Key Encrypted Data; total of 19 pages; printed on Oct. 29, 2012; located at http://www.iacr.org/archive/pkc2009/54430202/54430202.pdf.
"Can I encrypt user input in a way I can't decrypt it for a certain period of time?"; stackexchange, Cryptography beta; pp. 1-5; printed on Oct. 29, 2012; located at http://crypto.stackexchange.com/questions/2507/can-i-encrypt-user-input-in-a-way-i-cant-decrypt-it-for-a-certain-period-of-tim.
"Debunking the Myths of Column-level Encryption"; total of 6 pages; bearing a date of 2012; printed on Oct. 29, 2012; Vormetric, Inc.; located at http://www.vormetric.com/resources/white-papers/wp-myths-of-column-level-encryption.pdf.
Doukas et al.; "A Blind Source Separation Based Cryptography Scheme for Mobile Military Communication Applications"; WSEAS Transactions on Communications; bearing a date of Dec. 2008; pp. 1235-1245; Issue 12, vol. 7; located at http://www.academia.edu/413382/_J19_,_A_Blind_Source_Separation_Based_Cryptography_Scheme_for_Mobile_Military_Communication_Applications.
Gallegos-Garcia et al.; Identity based Threshold Cryptography and Blind Signatures for Electronic Voting; bearing a date of Jan. 2010; pp. 62-71; Issue 1, vol. 9; WSEAS Transactions on Computers; located at http://www.wseas.us/e-library/transactions/computers/2010/89-164.pdf.
Khiyal et al.; Dynamic Blind Group Digital Signature Scheme in E-Banking; International Journal of Computer and Electrical Engineering; bearing a date of Aug. 2011; pp. 514-519; vol. 3, No. 4; located at: www.ijcee.org/papers/371-E959.pdf.
Kwon et al.; "Protecting Secret Keys with Blind Computation Service"; printed on Oct. 29, 2012; pp. 1-11; Seoul National University; Seoul, Korea; located at http://citeseerx.ist.psu.edu/viewdoc/summary?doi=10.1.1.19.1902.
Lorimer, William R.; "Double Blind Comparisons: A New Approach to the Database Aggregation Problem"; bearing a date of May 16, 2011; total of 2 pages; Computer Science > Cryptography and Security, Cornell Universiiy Library; located at http://arxiv.org/abs/1105.3239.
Motro et al.; "Blind Custodians: A Database Service Architecture that Supports Privacy without Encryption"; bearing a date of 2005; printed on Oct. 29, 2012; pp. 338-352; volume-issue No. LNCS 3654; IFIP International Federation for Information Processing; located at: http://cs.gmu.edu/~ami/research/publications/pdf/dbsec05.pdf.
Motro et al.; "Blind Custodians: a database service architecture that supports privacy without encryption"; ACM Digital Library; printed on Oct. 30, 2012; total of 2 pages; George Mason University; Springer-Verlag Berlin, Heidelberg; located at http://dl.acm.org/citation.cfm?id=2138957.
"Proofpoint DoubleBlind™ Key Architecture"; bearing a date of 2012; printed on Oct. 29, 2012; total of 2 pages; ProofPoint, Inc.; Sunnyvale, CA; located at http://www.proofprint.com/datasheets/email-archiving/DS-Proofpoint-DoubleBlind-Key-Architecture.pdf.
"Proofpoint Enterprise Archive: DoubleBlind™ Key Architecture"; printed on Oct. 30, 2012; total of 2 pages; located at http://www.proofpoint.com/products/archive/doubleblind-key-architecture.php.
Schonberg et al.; "On Blind Compression of Encrypted Correlated Data Approaching The Source Entropy Rate*"; total of 10 pages; printed on Oct. 29, 2012; U. of California, Berkeley; located at http://sdraper.ece.wisc.edu/researchDir/pdf/allerton05_encrypt.pdf.
Slik, David; "Vanishing Into the Infrastructure"; bearing a date of Jun. 29, 2009; printed on Oct. 29, 2012; total of 3 pages; Blogspot; located at http://intotheinfrastructure.blogspot.com/2009/06/where-does-encryption-fit-in-cloud.html.

* cited by examiner

FIGURE 1 is inclusive of:

| Fig. 1-A | Fig. 1-B | Fig. 1-C | Fig. 1-D | Fig. 1-E | Fig. 1-F |
| Fig. 1-G | Fig. 1-H | Fig. 1-I | Fig. 1-J | Fig. 1-K | Fig. 1-L |
| Fig. 1-M | Fig. 1-N | Fig. 1-O | Fig. 1-P | Fig. 1-Q | Fig. 1-R |
| Fig. 1-S | Fig. 1-T | Fig. 1-U | Fig. 1-V | Fig. 1-W | Fig. 1-X |

Fig. 1-A

This page is a partial view of a complete view that is extended over several sheets. This page is included so that there is no loss in facility of understanding the view. See 37 C.F.R. 1.84(h)(2). This page is capable of being linked edge to edge with Fig. 1-A to the left, Fig. 1-C to the right, Fig. 1-H below, and no figure above.

To the right direction, this line passes through Figs. 1-C and 1-D in directional flow order, ultimately terminating at modules 104/106 of Fig. 1-D To the downward/left direction, this line passes through Fig. 1-H, ultimately terminating at module 163 of Fig. 1-N

Fig. 1-B

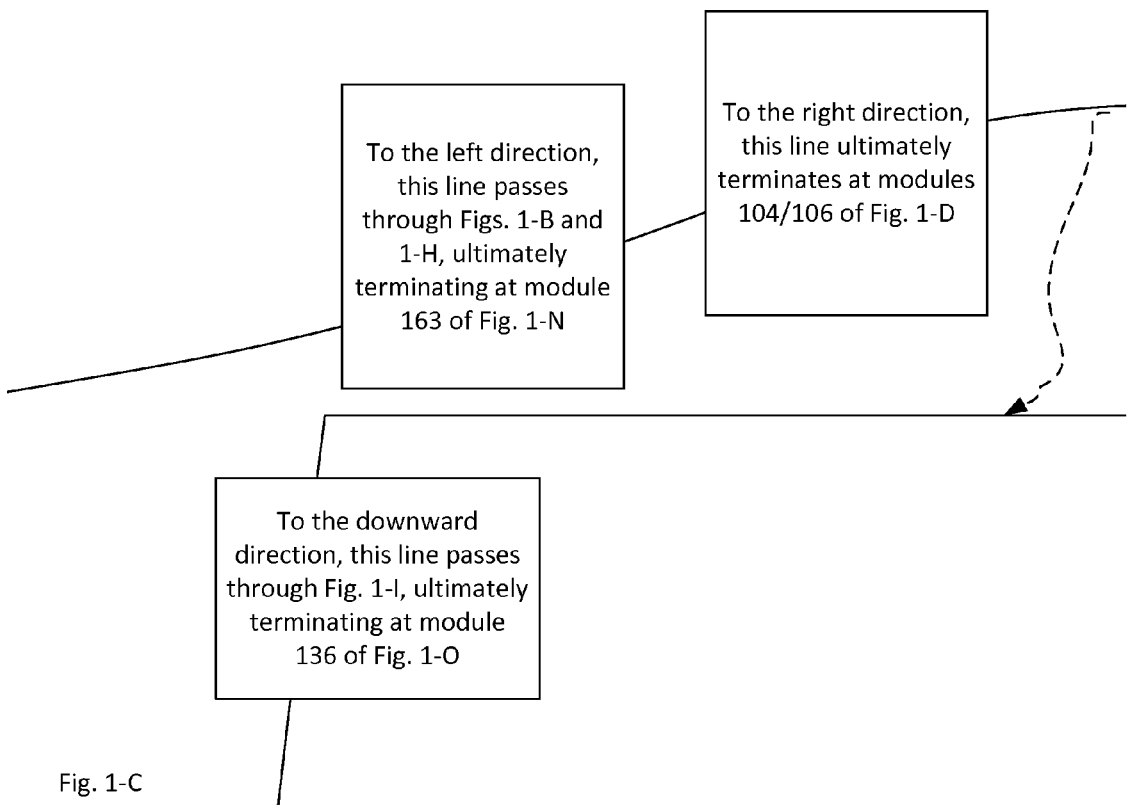
Fig. 1-C

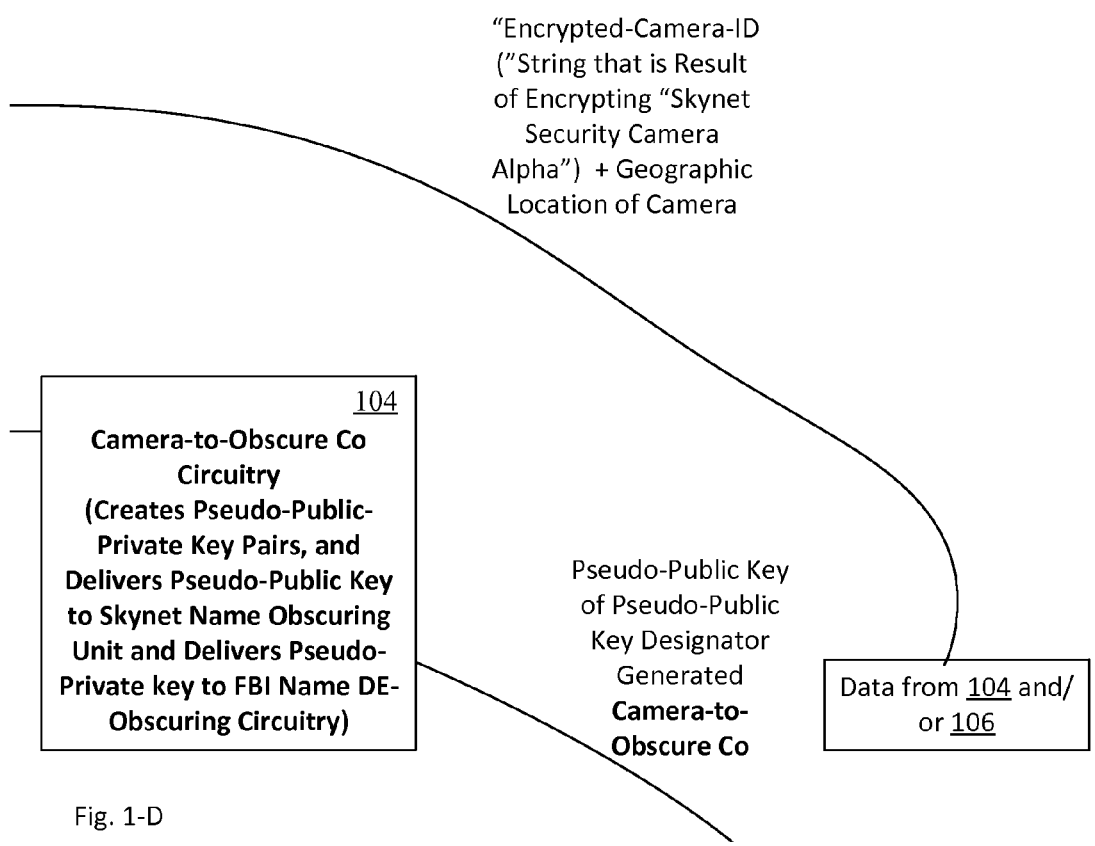
Fig. 1-D

Note_1: Cameras in general. Privacy in cameras. This idea was you could attach a camera to the equivalent of a lockbox where it is recording you entering a store and you are somehow made aware that everything is encrypted the moment it is recorded, so it is never kept in the clear anywhere. The first time it is viewable is after the double encryption under control of the government.

Note_2: In various embodiments, "Encrypted-Camera-ID" could be outside/inside first encryption/second encryption/etc.; but perhaps best that it stay outside encryption

| "Encrypted-Camera-ID" + "Date: 16 June 2014; Time 10:00 a.m. – 11:00 a.m." + Unique Heuristic-Algorithm Services Key Pair Designator" | Level Two Encrypted CCD Output (e.g., Doubly-Encrypted CCD Output Lockbox) <u>121</u> |

This page is a partial view of a complete view that is extended over several sheets. This page is included so that there is no loss in facility of understanding the view. See 37 C.F.R. 1.84(h)(2). This page is capable of being linked edge to edge with Fig. 1-A above, Fig. 1-H to the right, Fig. 1-M below, and no figure to the left.

Fig. 1-G

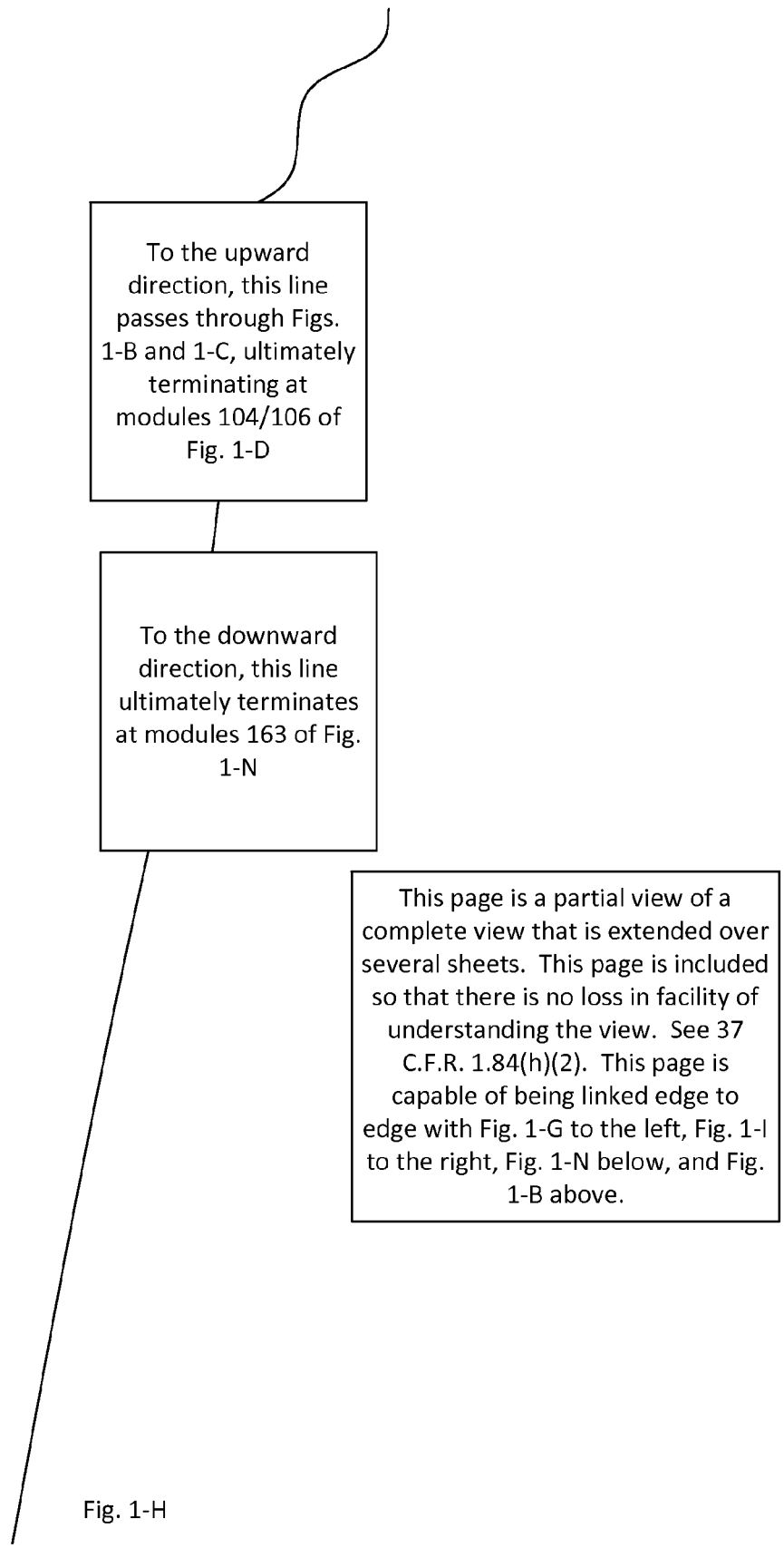

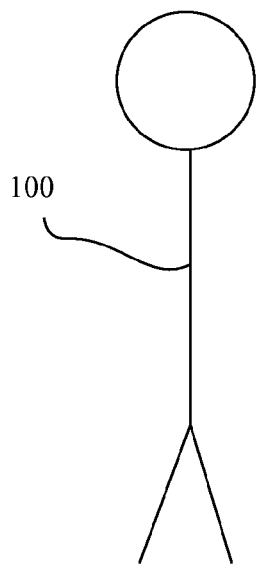
Fig. 1-I

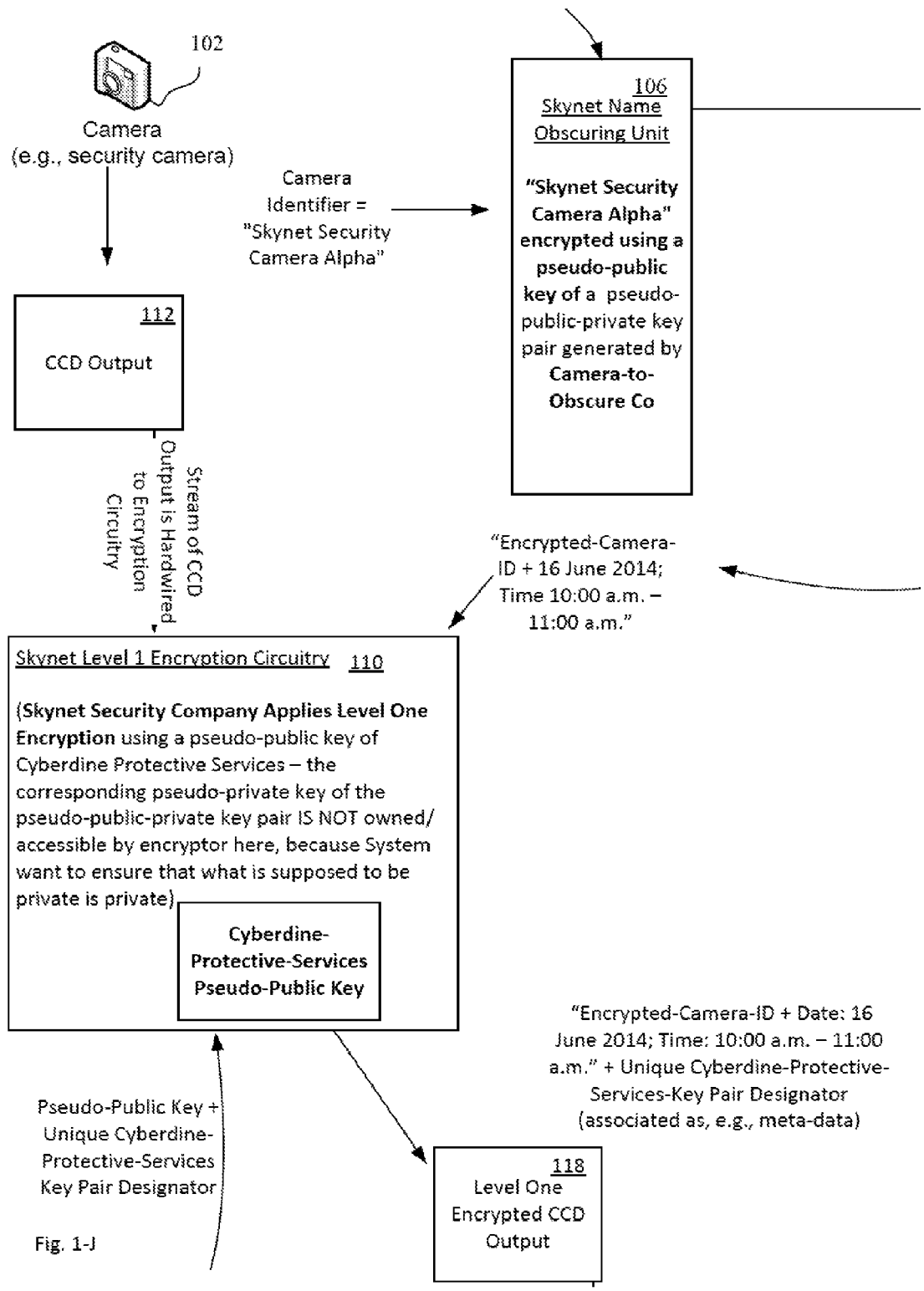
Fig. 1-J

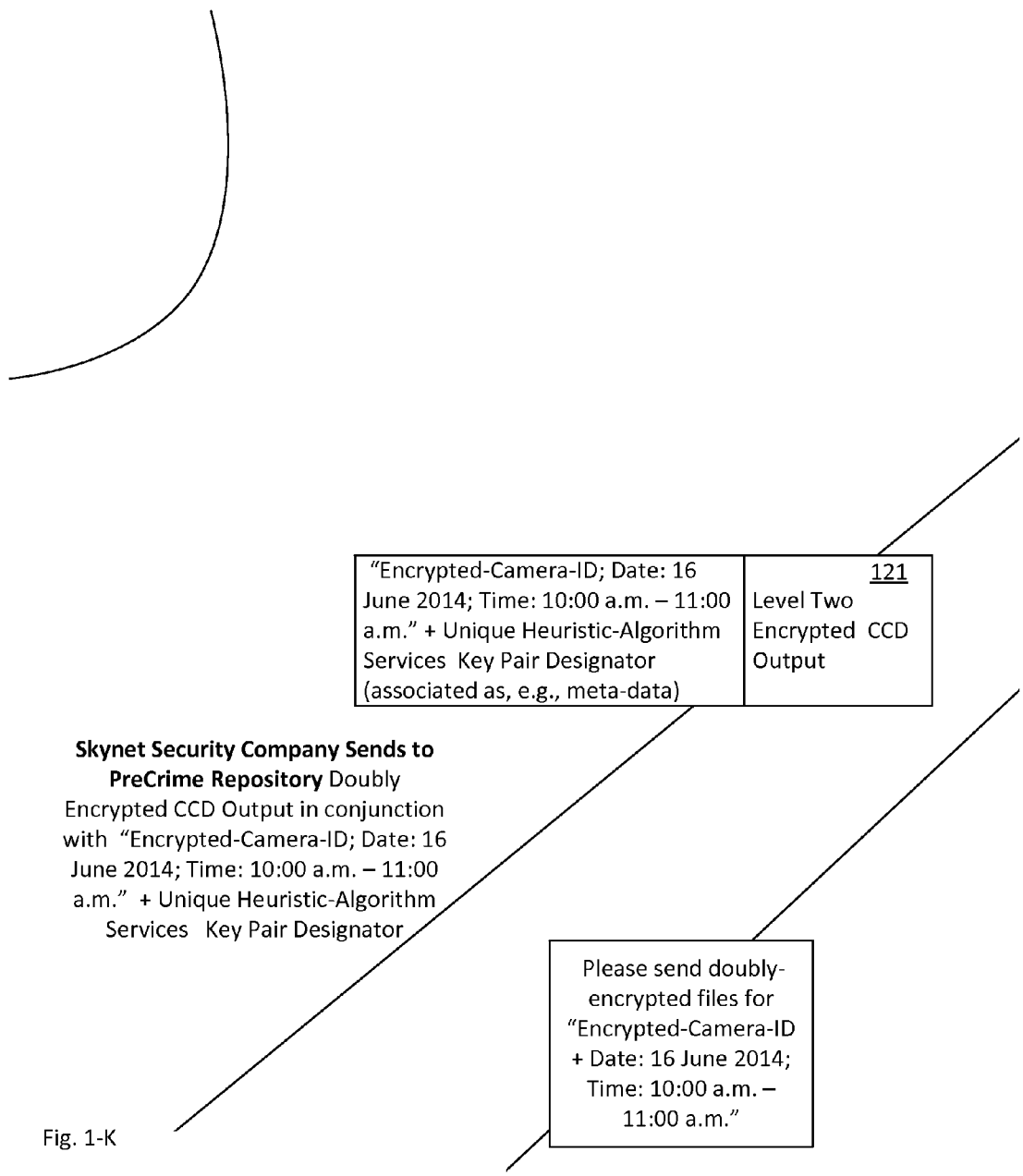
Fig. 1-K

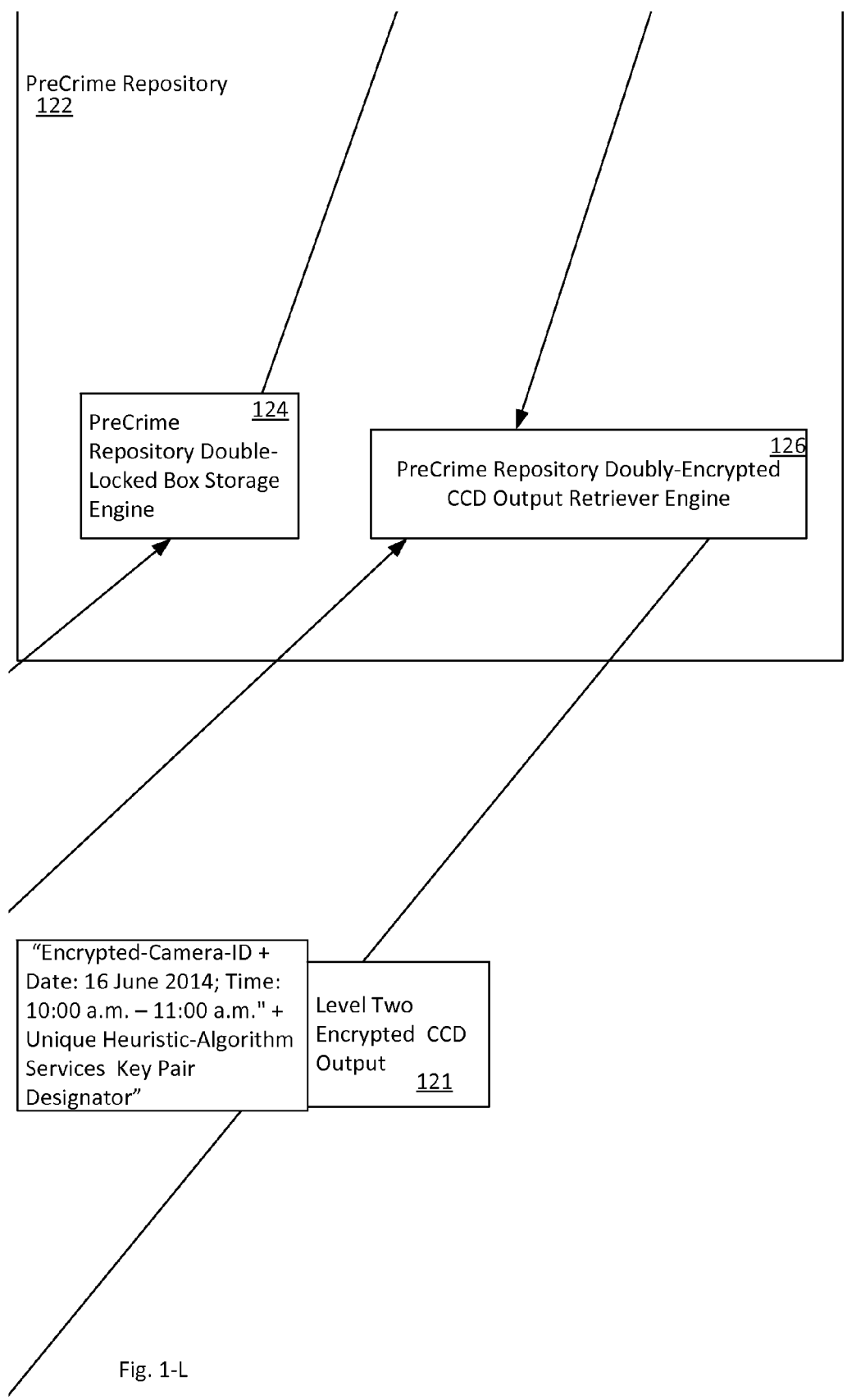
Fig. 1-L

This page is a partial view of a complete view that is extended over several sheets. This page is included so that there is no loss in facility of understanding the view. See 37 C.F.R. 1.84(h)(2). This page is capable of being linked edge to edge with Fig. 1-G above, Fig. 1-N to the right, Fig. 1-S below, and no figure to the left.

Fig. 1-M

"Encrypted-Camera-ID
("String that is Result
of Encrypting "Skynet
Security Camera
Alpha") + Geographic
Location of Camera
Sent by Skynet Security
Services' Automation

Fig. 1-N

163
Department of Treasury Encryted Camera ID + Camera Location Repository Circuitry
(Camera-to-Obscure Co. has Previously Sent Encrypted Camera IDs associated with Various Locations at Various Times Here for another Level of Security)

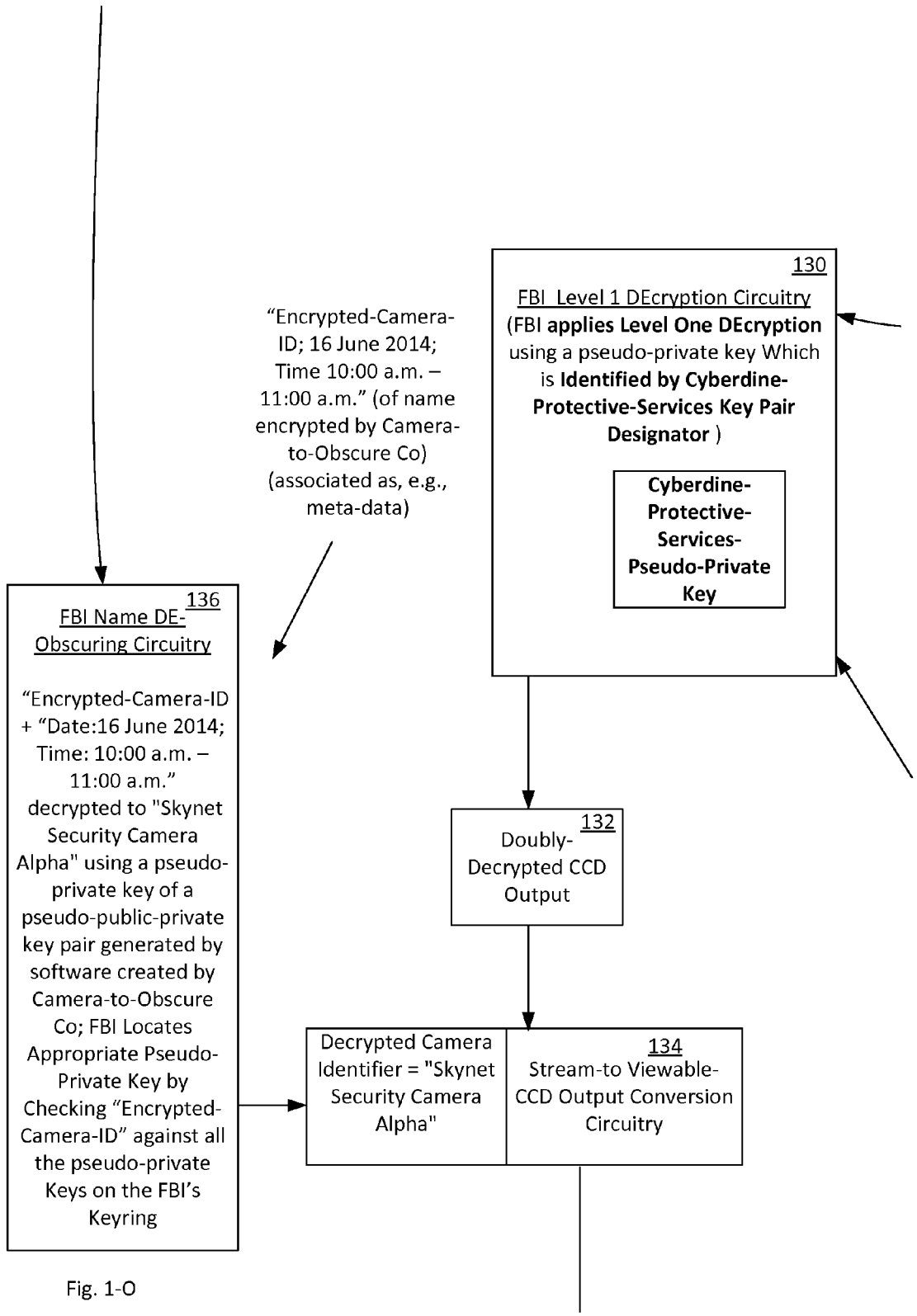
Fig. 1-O

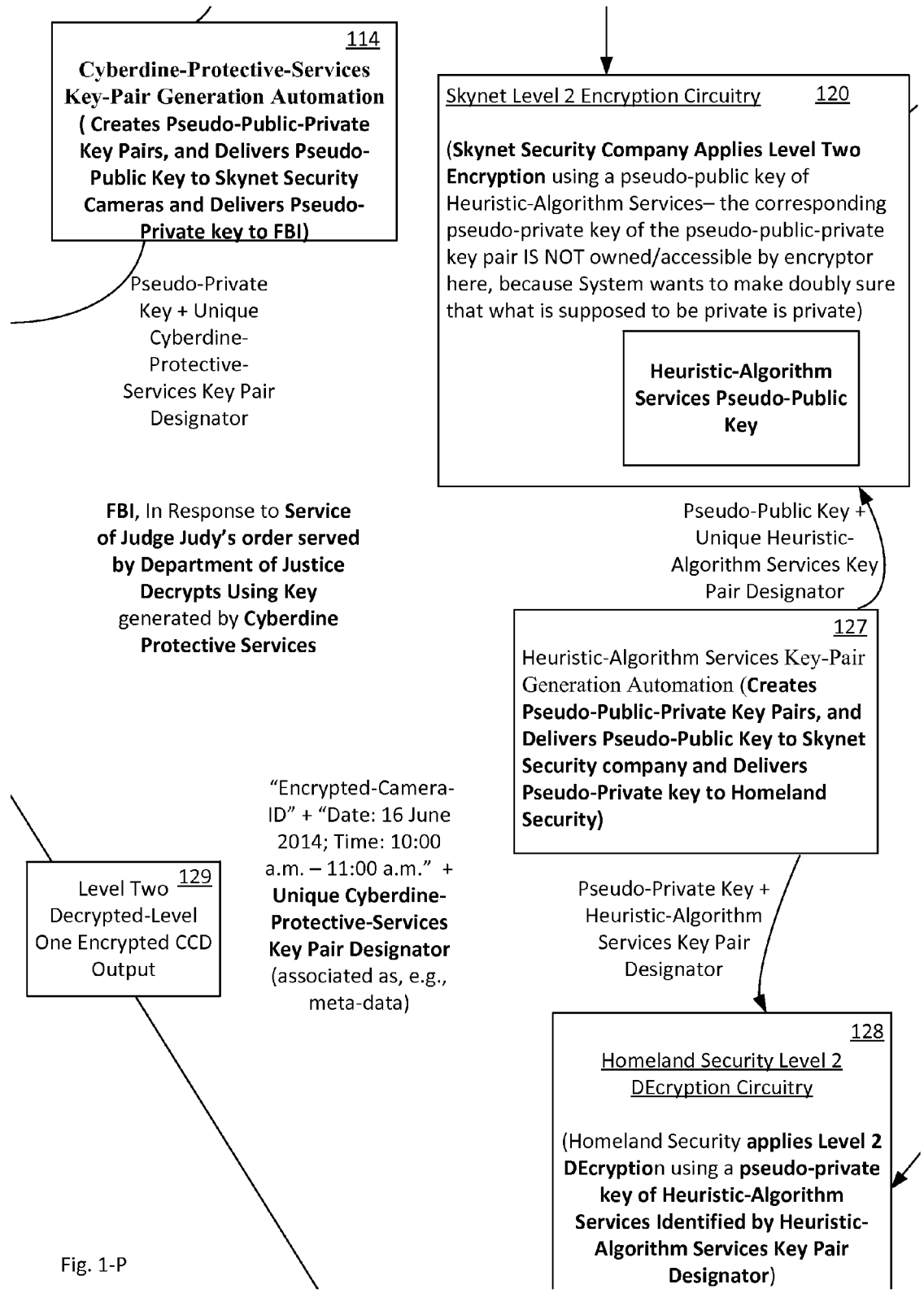
Fig. 1-P

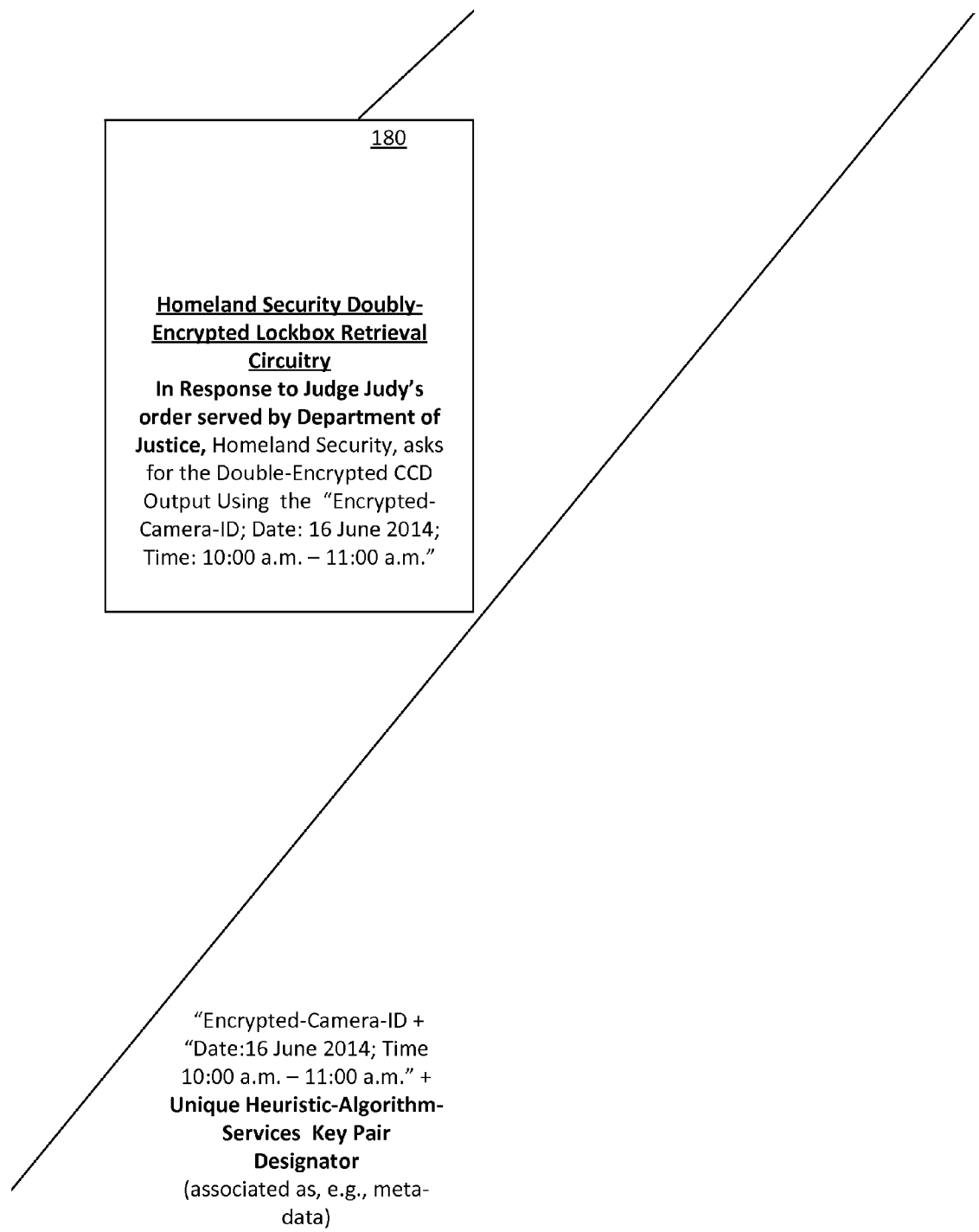
Fig. 1-Q

This page is a partial view of a complete view that is extended over several sheets. This page is included so that there is no loss in facility of understanding the view. See 37 C.F.R. 1.84(h)(2). This page is capable of being linked edge to edge with Fig. 1-L above, Fig. 1-Q to the left, Fig. 1-X below, and no figure to the right.

Fig. 1-R

This page is a partial view of a complete view that is extended over several sheets. This page is included so that there is no loss in facility of understanding the view. See 37 C.F.R. 1.84(h)(2). This page is capable of being linked edge to edge with Fig. 1-M above, Fig. 1-T to the right, no figure below, and no figure to the left.

Fig. 1-S

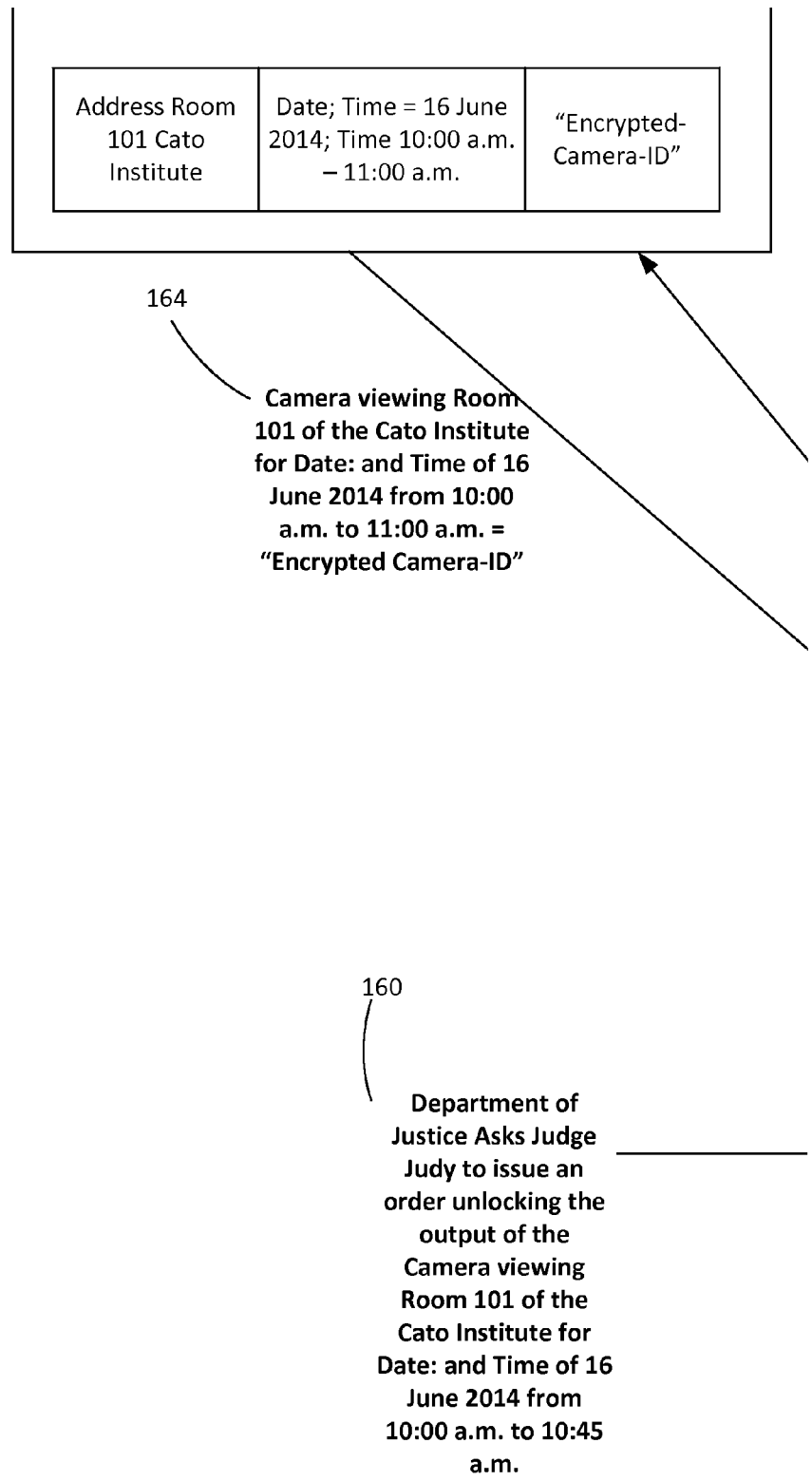
Fig. 1-T

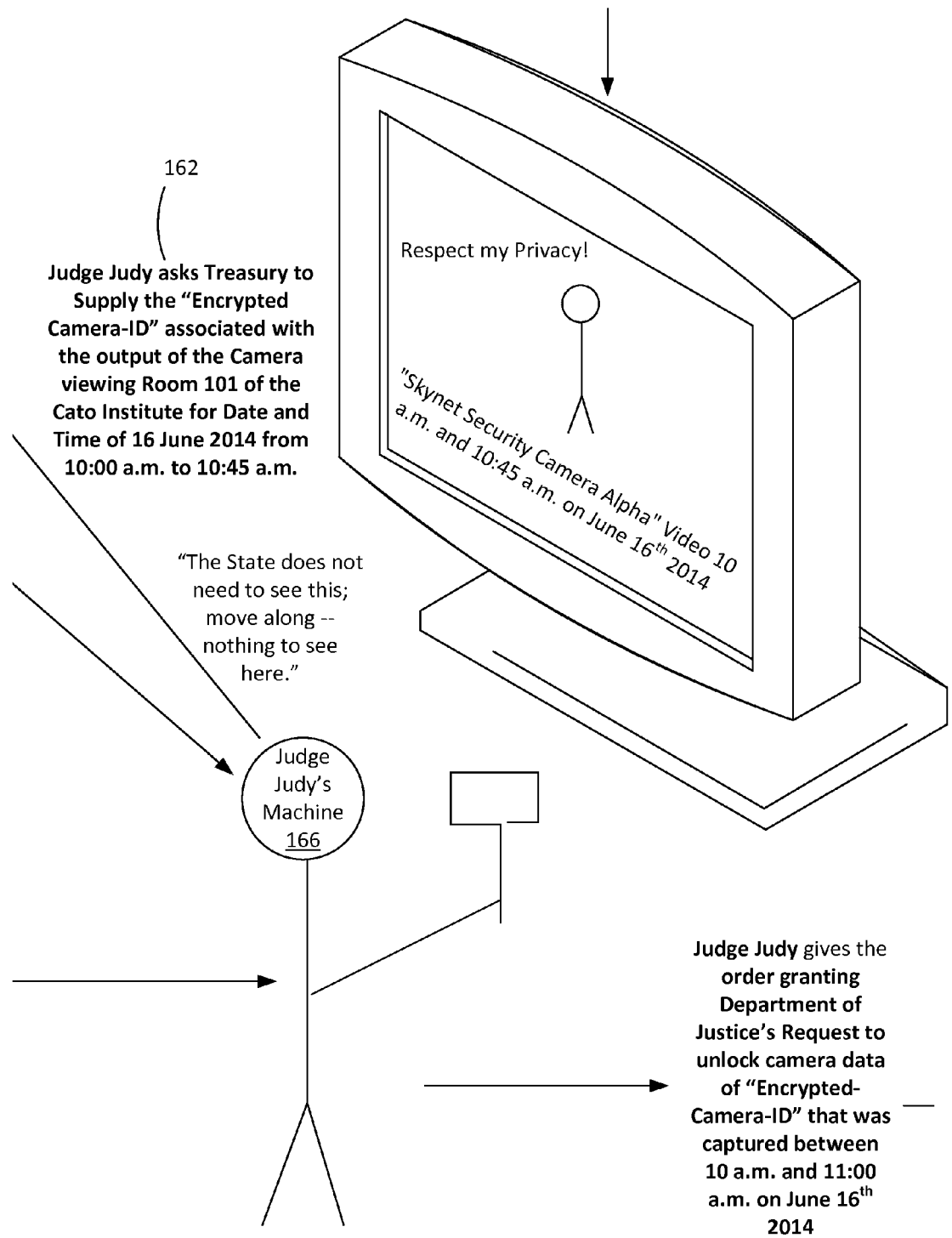
Fig. 1-U

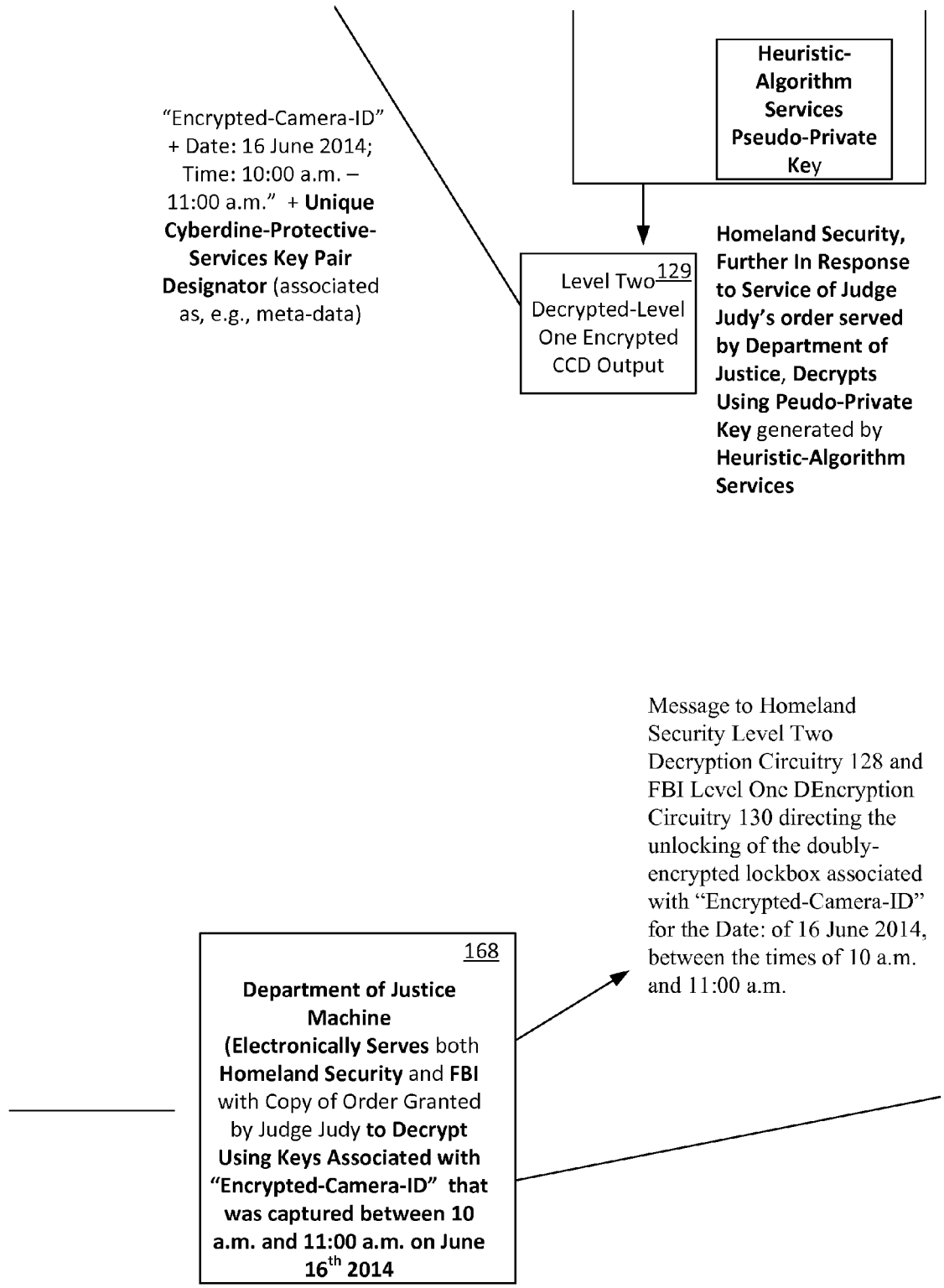
Fig. 1-V message to Homeland
Security Doubly-Encrypted
Lockbox Retrieval Circuitry
180 directing the retrieval of
the doubly-encrypted lockbox
associated with "Encrypted-
Camera-ID" for the Date: of
16 June 2014, between the
times of 10 a.m. and 11:00
a.m.

Note: since people may ask for double encrypted CCD Output days or years after it is captured, there will either need to be tracking/storage of the key pairs for first/second encryptions or cycling of the key pairs.

Fig. 1-W

This page is a partial view of a complete view that is extended over several sheets. This page is included so that there is no loss in facility of understanding the view. See 37 C.F.R. 1.84(h)(2). This page is capable of being linked edge to edge with Fig. 1-R above, Fig. 1-W to the left, no figure below, and no figure to the left.

Fig. 1-X

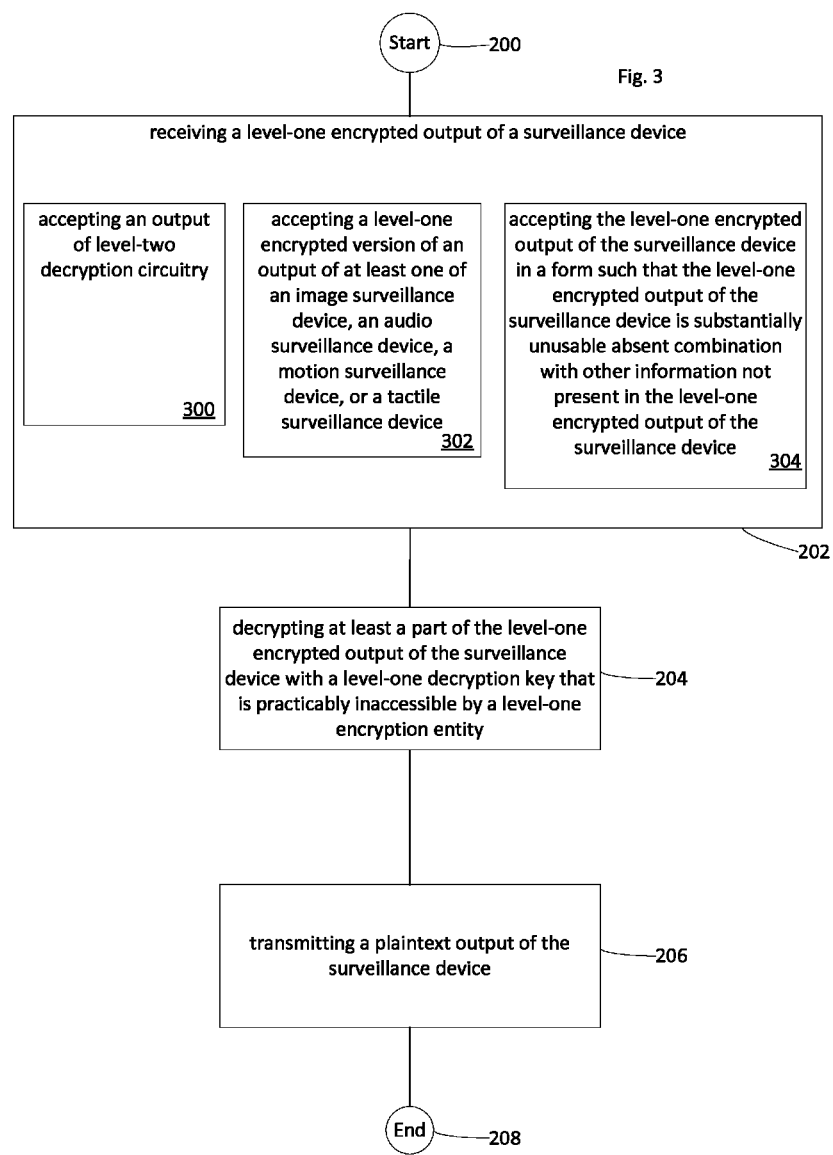

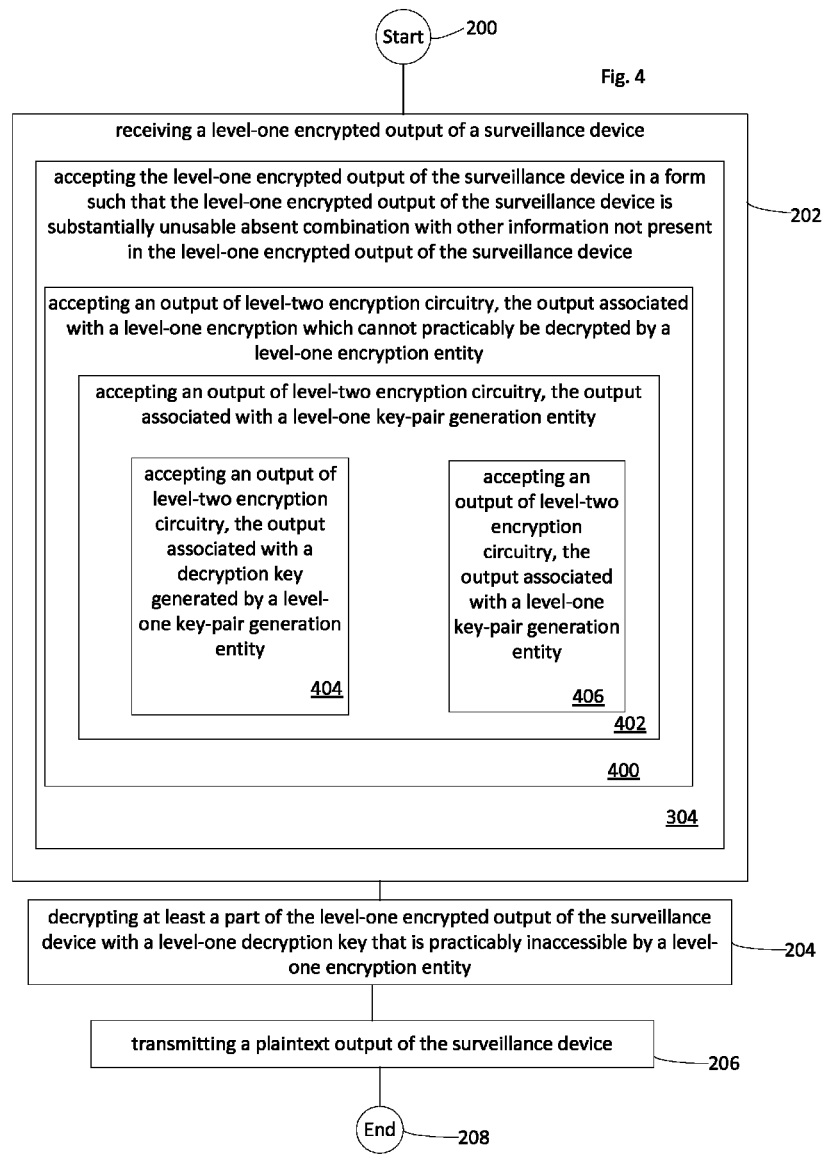

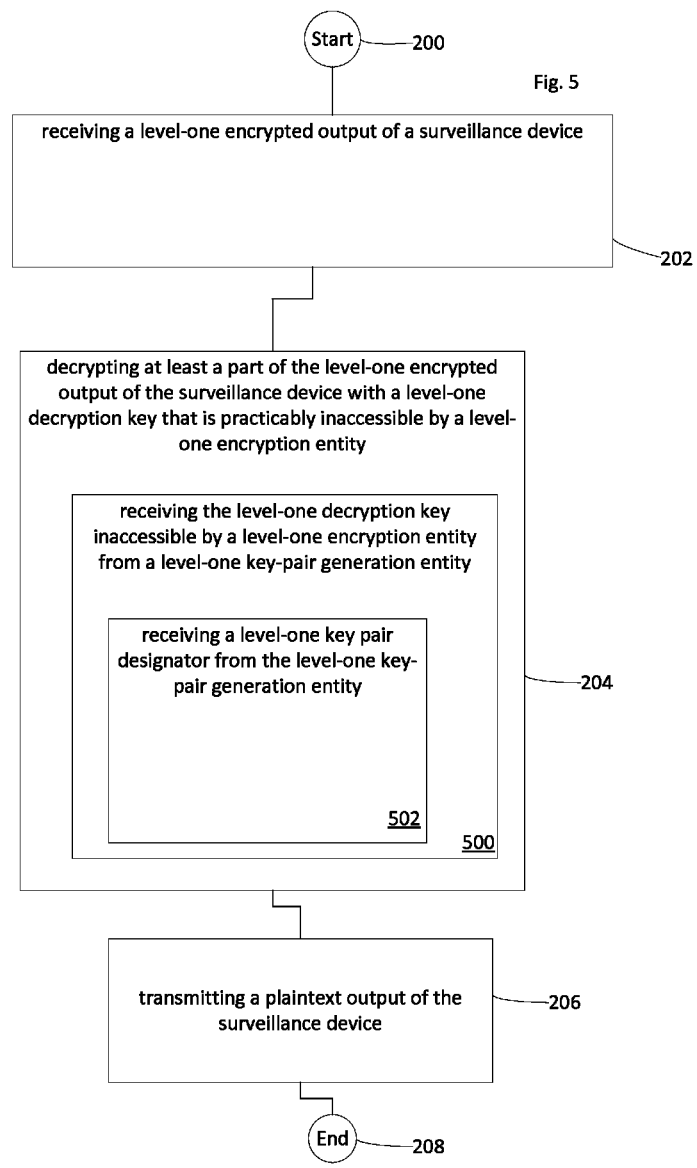

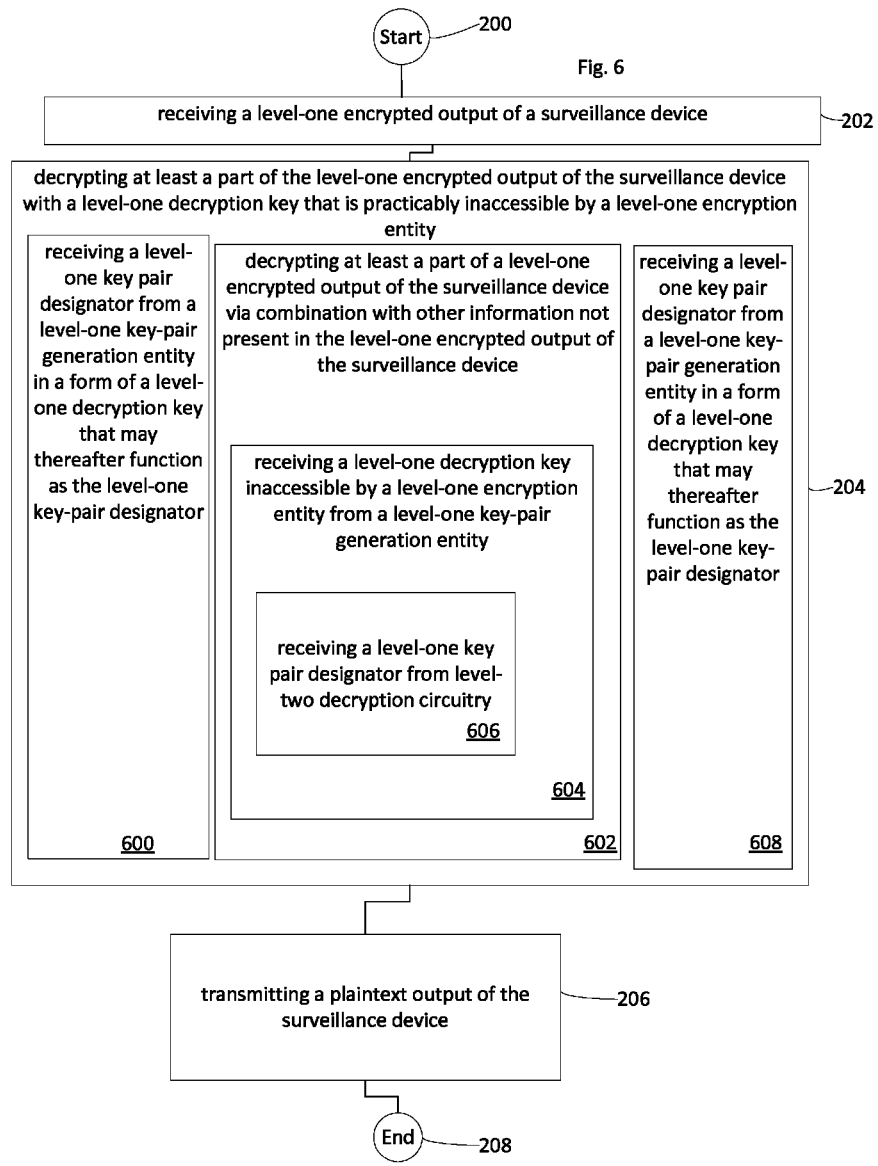

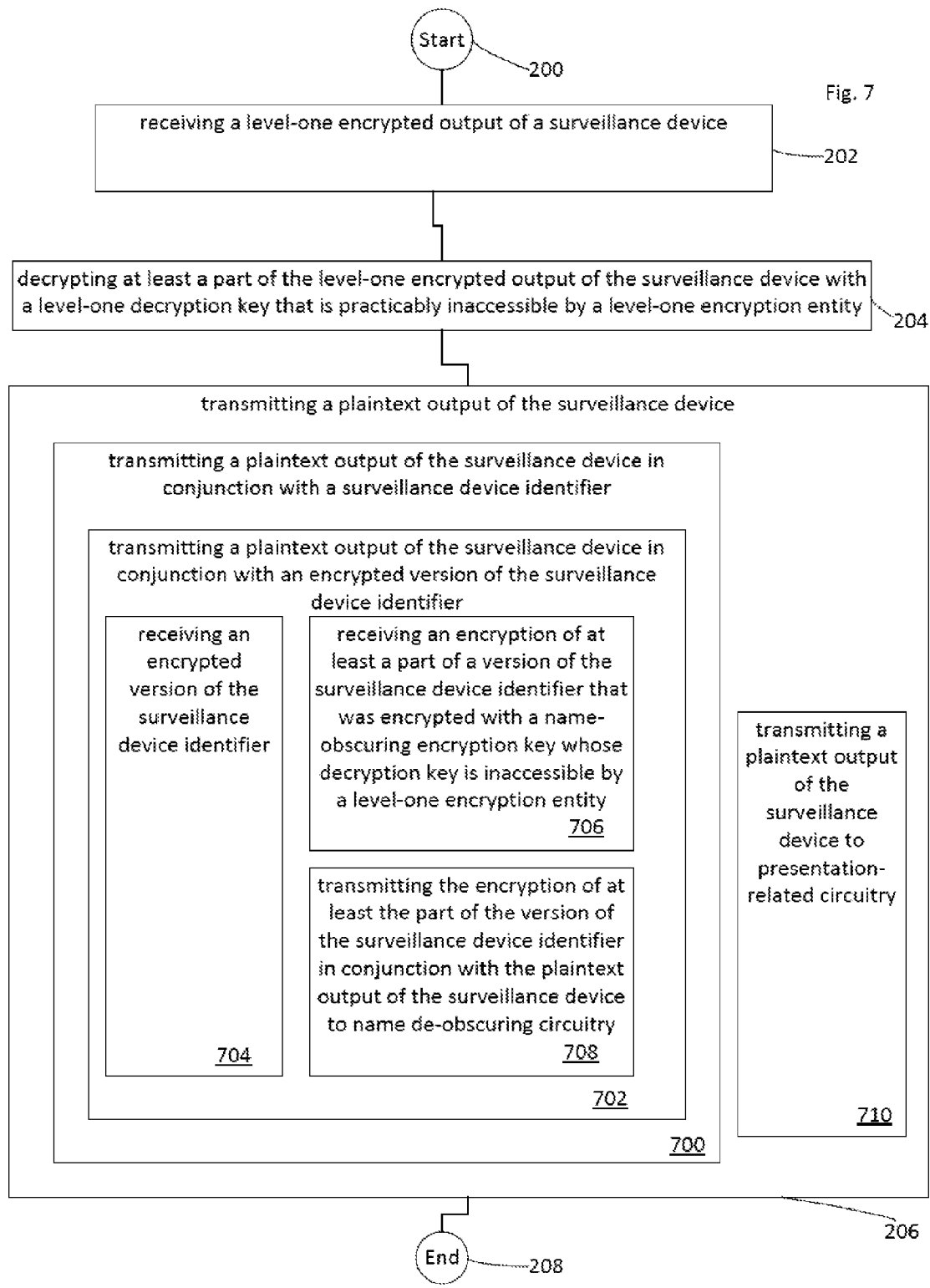

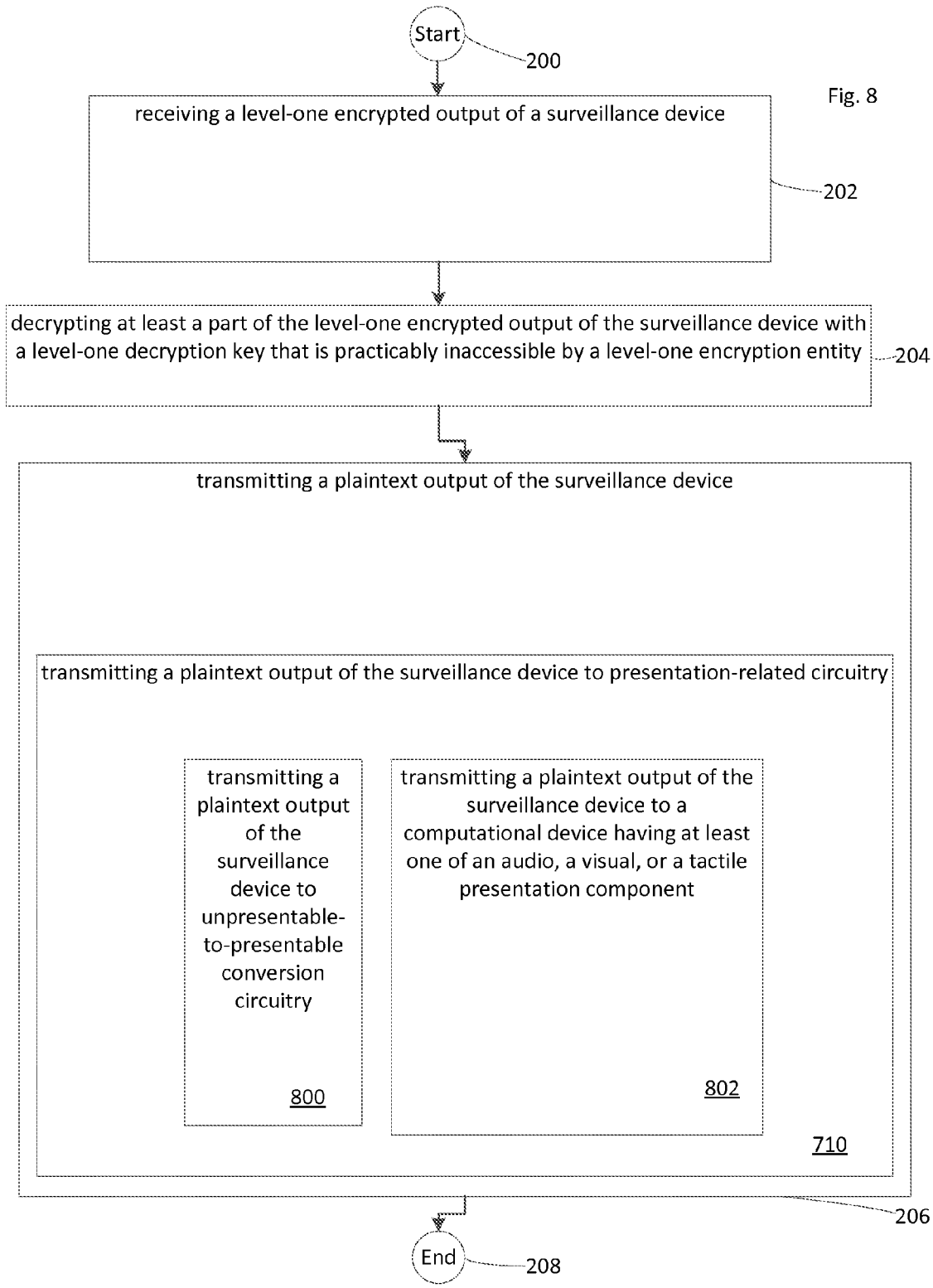

FIGURE 9 is inclusive of:

| Fig. 9-A | Fig. 9-B | Fig. 9-C | Fig. 9-D | Fig. 9-E | Fig. 9-F |
| Fig. 9-G | Fig. 9-H | Fig. 9-I | Fig. 9-J | Fig. 9-K | Fig. 9-L |
| Fig. 9-M | Fig. 9-N | Fig. 9-O | Fig. 9-P | Fig. 9-Q | Fig. 9-R |
| Fig. 9-S | Fig. 9-T | Fig. 9-U | Fig. 9-V | Fig. 9-W | Fig. 9-X |

Fig. 9-A

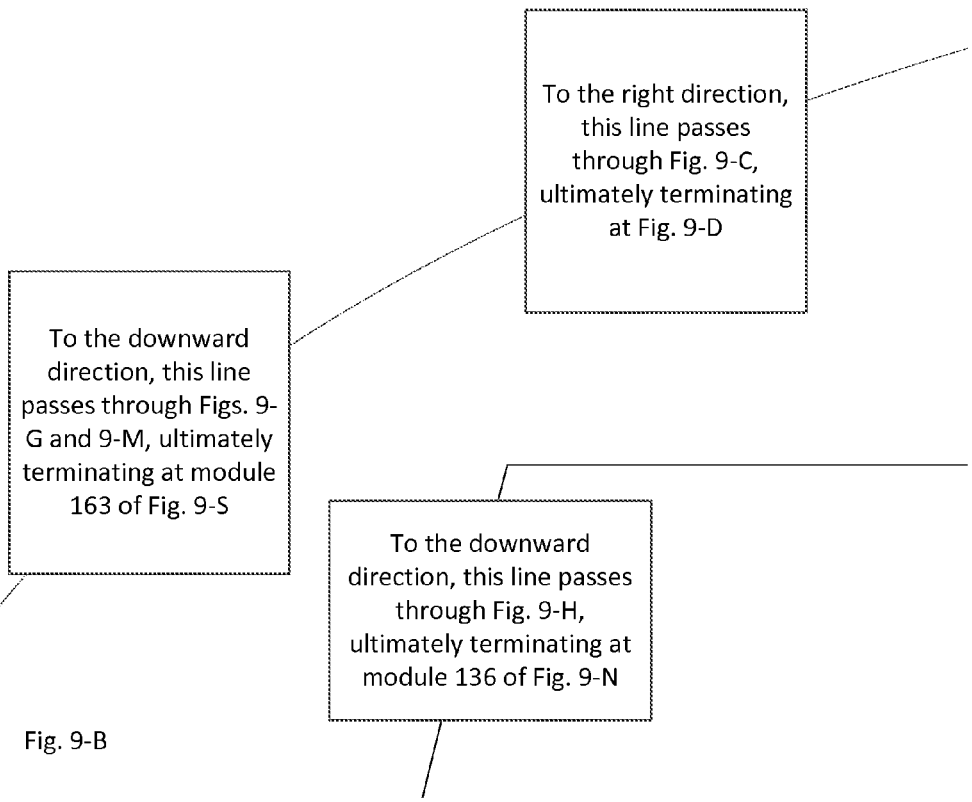

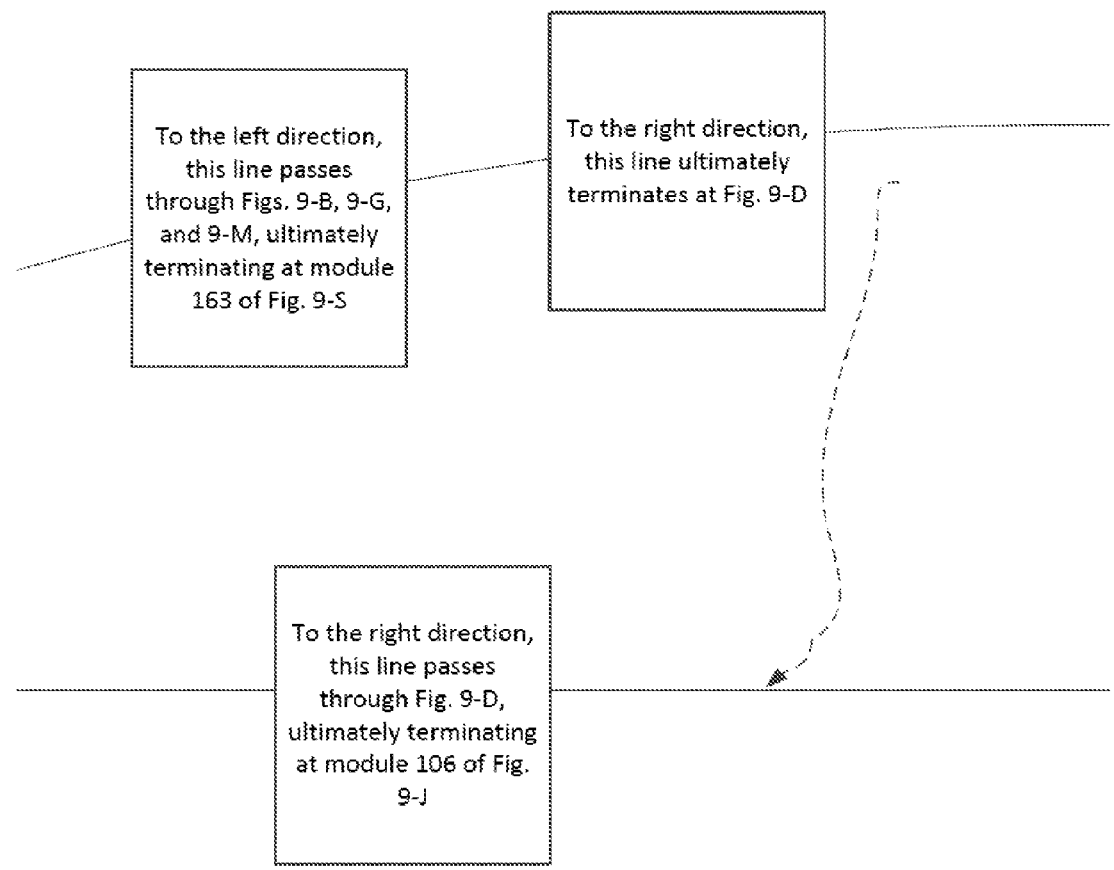
Fig. 9-C

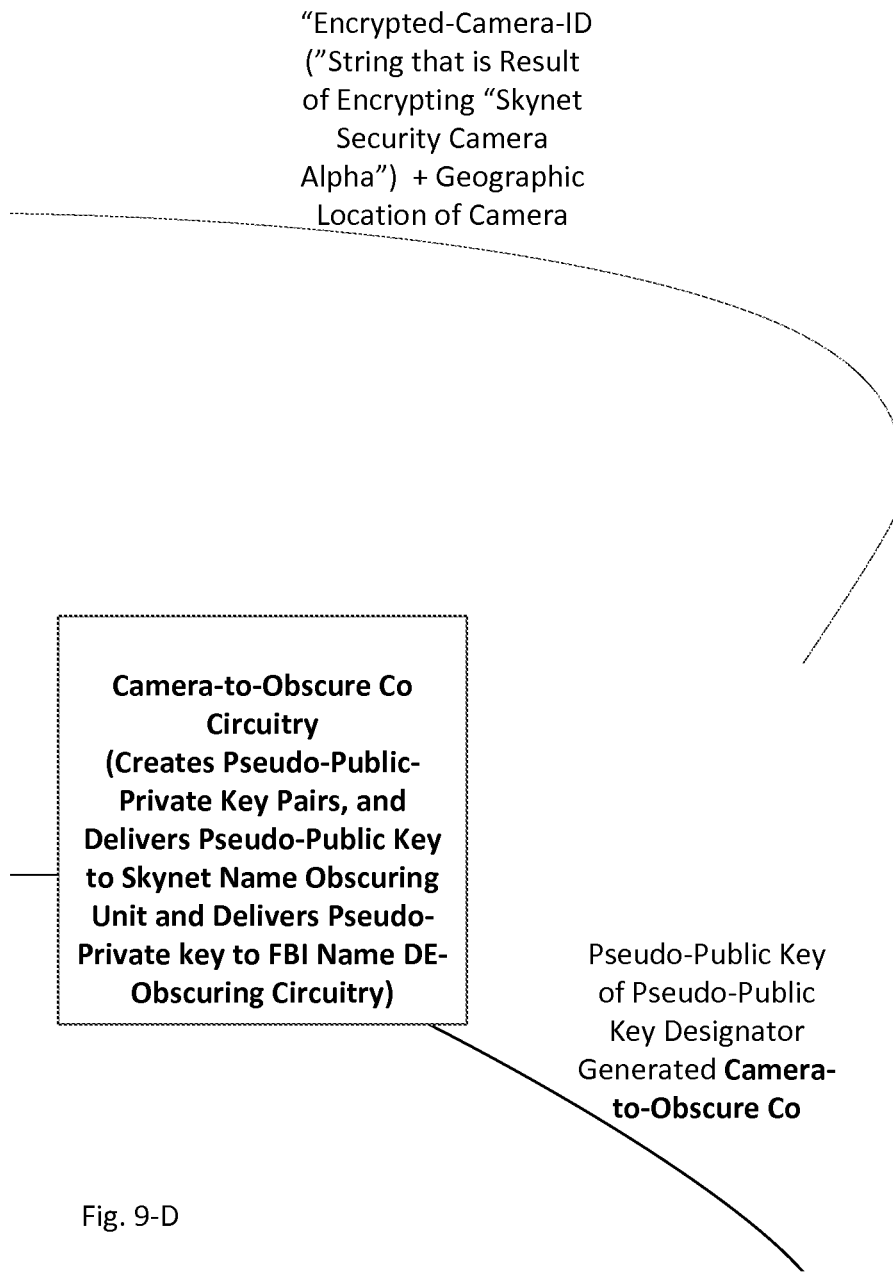
Fig. 9-D

Note_1: Cameras in general. Privacy in cameras. This idea was you could attach a camera to the equivalent of a lockbox where it is recording you entering a store and you are somehow made aware that everything is encrypted the moment it is recorded, so it is never kept in the clear anywhere. The first time it is viewable is after the double encryption under control of the government.

Note_2: In various embodiments, "Encrypted-Camera-ID" could be outside/inside first encryption/second encryption/etc.; but perhaps best that it stay outside encryption

Fig. 9-E

This page is a partial view of a complete view that is extended over several sheets. This page is included so that there is no loss in facility of understanding the view. See 37 C.F.R. 1.84(h)(2). This page is capable of being linked edge to edge with Fig. 9-E to the left, no figure to the right, Fig. 9-L below, and no figure above.

Fig. 9-F

This page is a partial view of a complete view that is extended over several sheets. This page is included so that there is no loss in facility of understanding the view. See 37 C.F.R. 1.84(h)(2). This page is capable of being linked edge to edge with no figure to the left, Fig. 9-H to the right, Fig. 9-M below, and Fig. 1-A above.

To the downward direction, this line passes through Fig. 9-M, ultimately terminating at module 163 of Fig. 9-S

Fig. 9-G

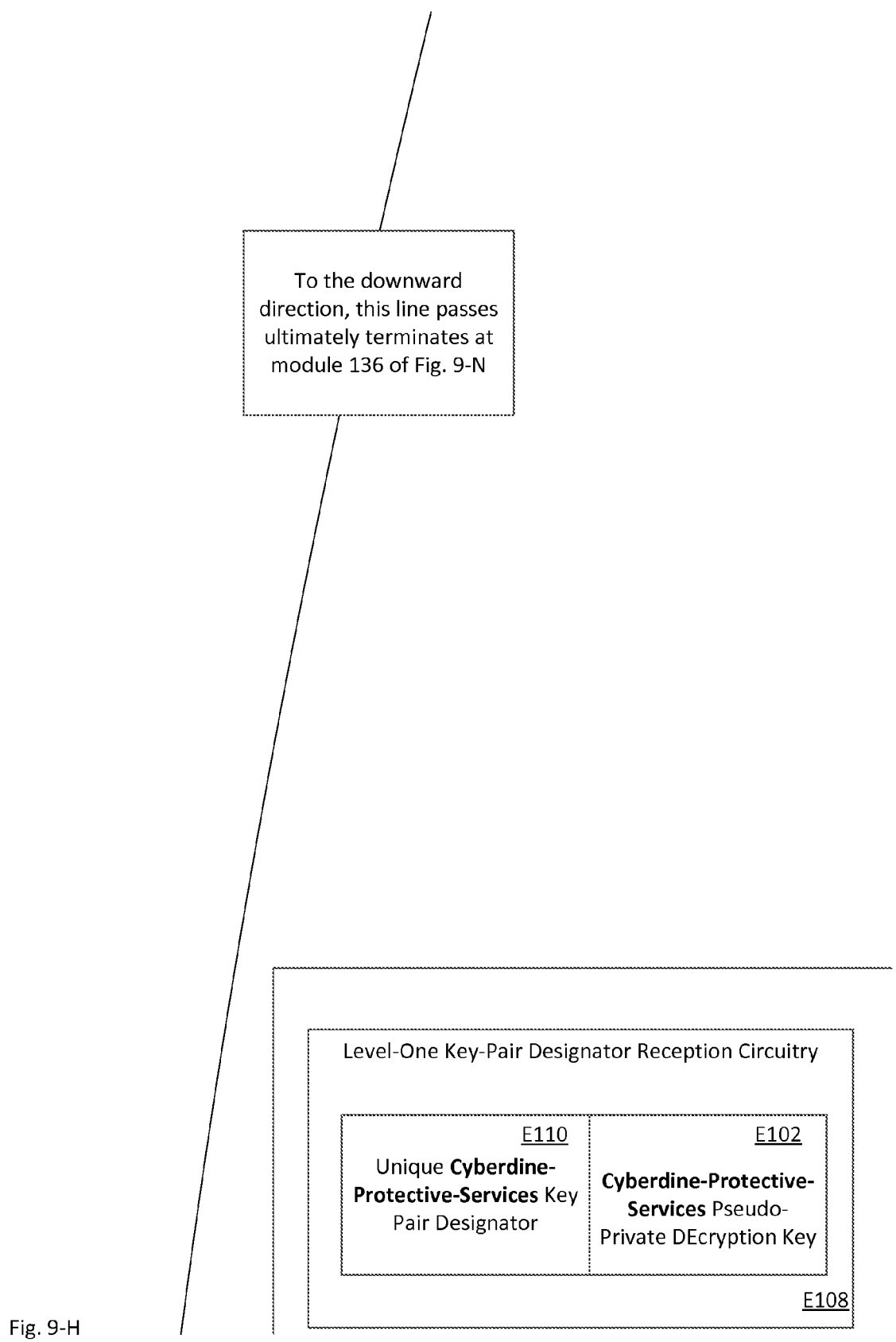

Respect my Privacy, and keep your intrusive cameras off my body!
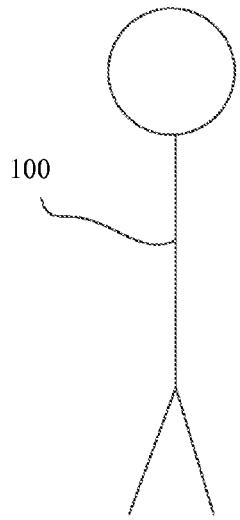
100
(Atypical person is shown as being present in Room 101 of the Cato Institute)
---
FBI Level 1 DEcryption Circuitry             130
  (FBI applies Level One DEcryption using a pseudo-private key Which is Identified by Cyberdine-Protective-Services Key Pair Designator )
Fig. 9-I

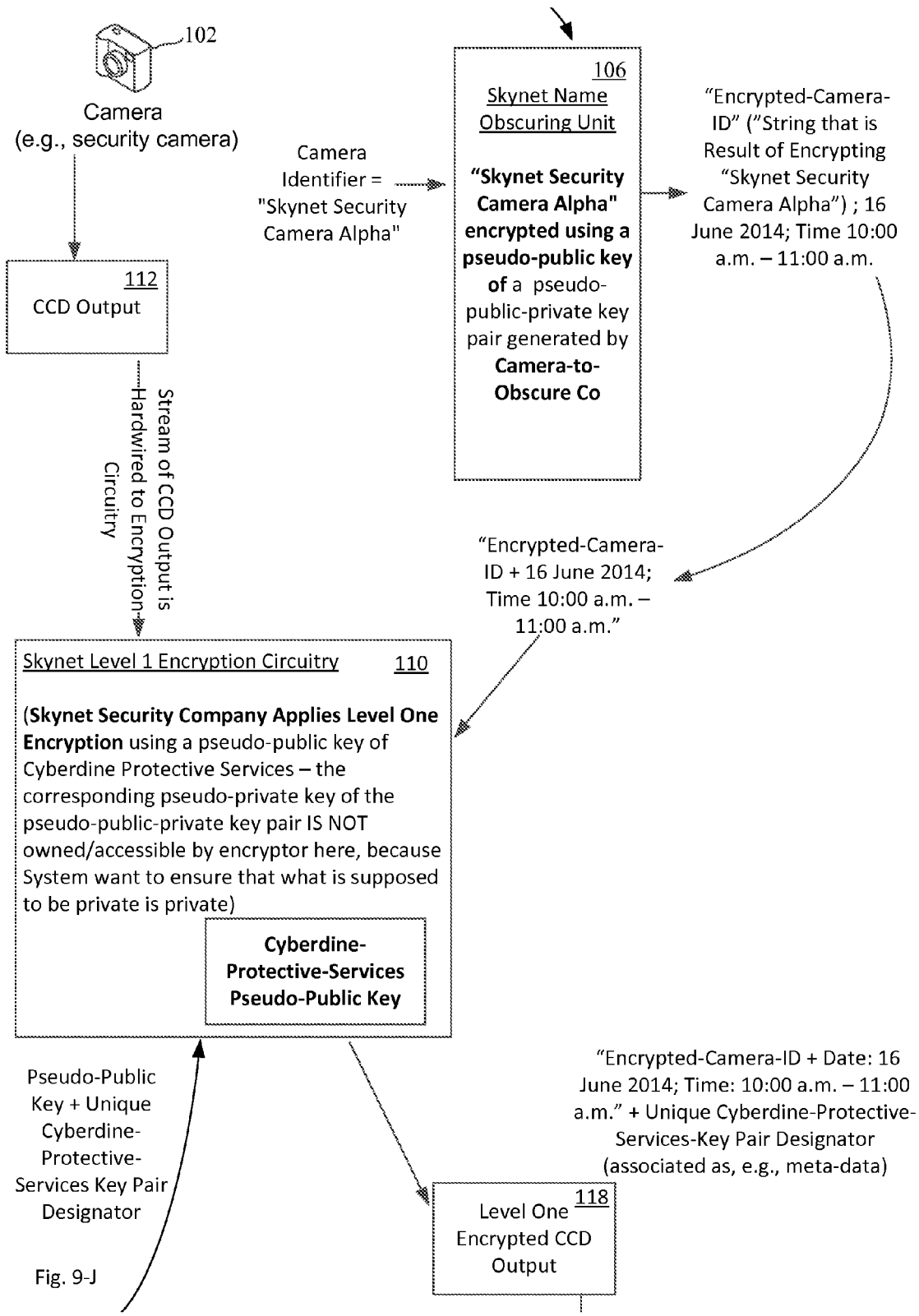
Fig. 9-J

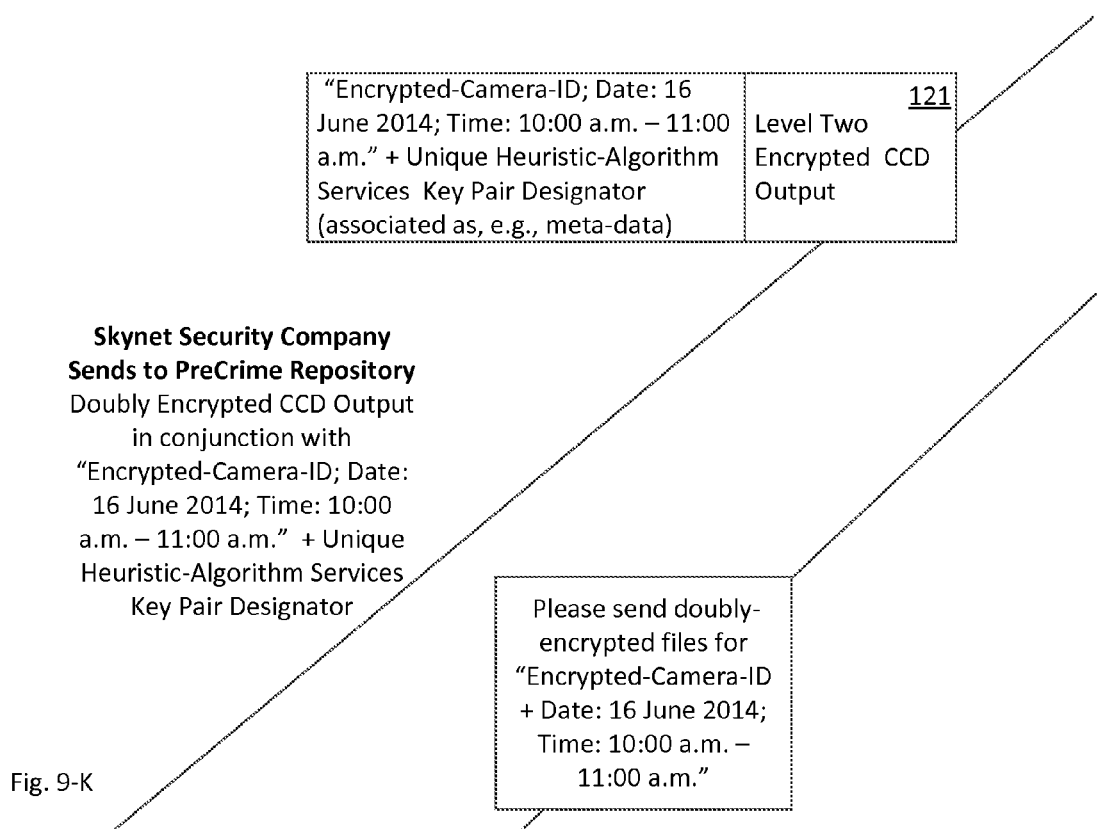
Fig. 9-K

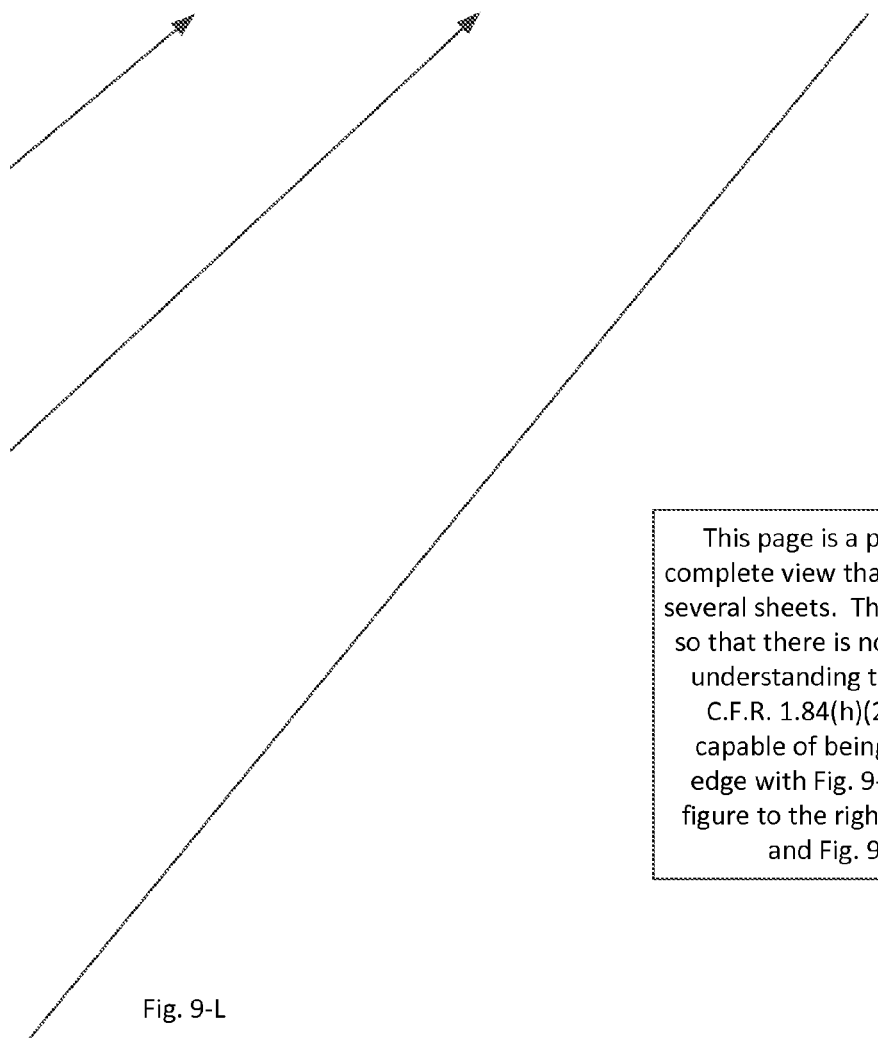
Fig. 9-L
This page is a partial view of a complete view that is extended over several sheets. This page is included so that there is no loss in facility of understanding the view. See 37 C.F.R. 1.84(h)(2). This page is capable of being linked edge to edge with Fig. 9-K to the left, no figure to the right, Fig. 9-R below, and Fig. 9-F above.

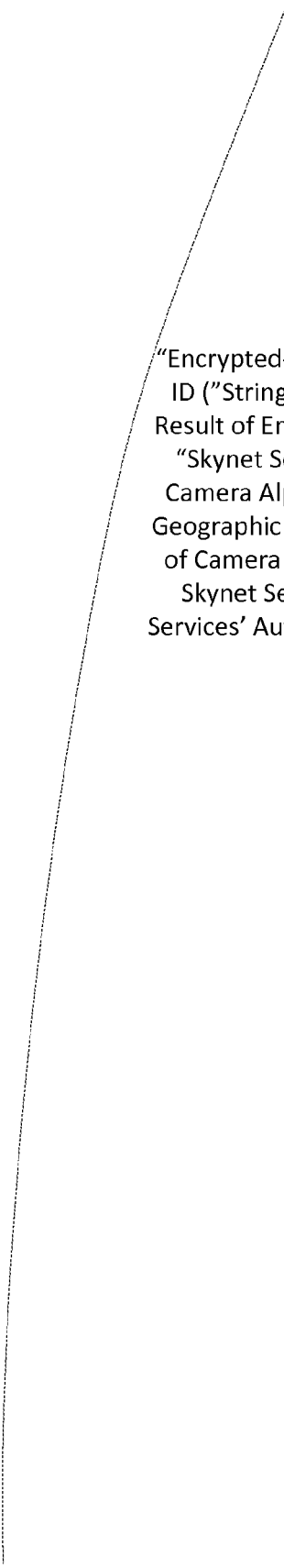
Fig. 9-M

Pseudo-Private Key Generated by Camera-to-Obscure Co that Corresponds to Pseudo-Public Key that Was Used to Encrypt "Skynet Security Company Alpha "for Date: 16 June 2014; Time: 10 a.m. – 11:00 a.m.

Level-One Decrypted Transmission Circuitry

E118

Doubly-DEcrypted CCD Output (e.g., a version of CCD Output 112 that is the result of Level-One Sighted DEcryption Circuitry Singly DEcrypting that Which Had been Doubly Encrypted via application of encryption with Heuristic Algorithm Services Pseudo-Public Encryption Key at Level Two and Cyberdine Protective Services Pseudo-Public Encryption Key at Level One)

136

FBI Name DE-Obscuring Circuitry

"Encrypted-Camera-ID + "Date:16 June 2014; Time: 10:00 a.m. – 11:00 a.m."
decrypted to "Skynet Security Camera Alpha" using a pseudo-private key of a pseudo-public-private key pair generated by software created by Camera-to-Obscure Co; FBI Locates Appropriate Pseudo-Private Key by Checking "Encrypted-Camera-ID" against all the pseudo-private Keys on the FBI's Keyring

Fig. 9-N

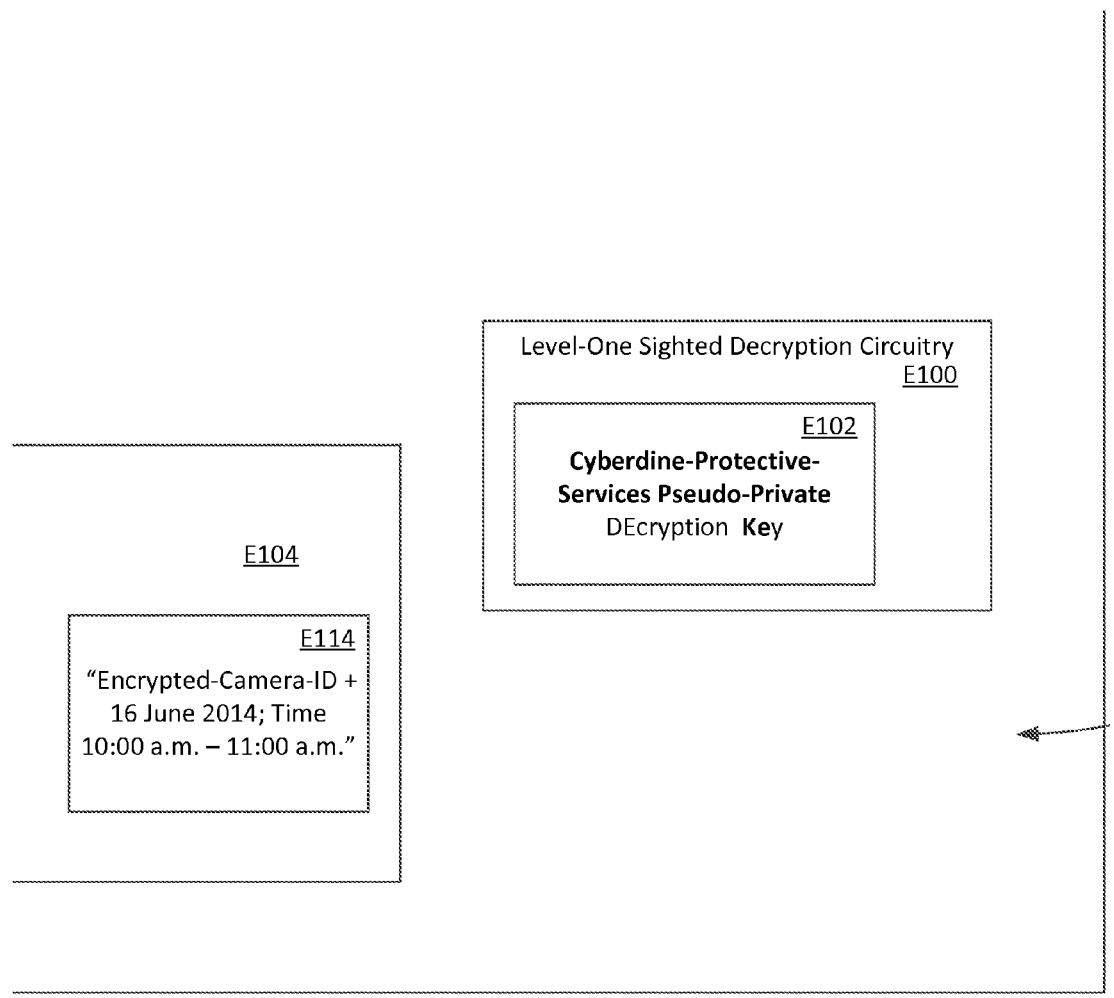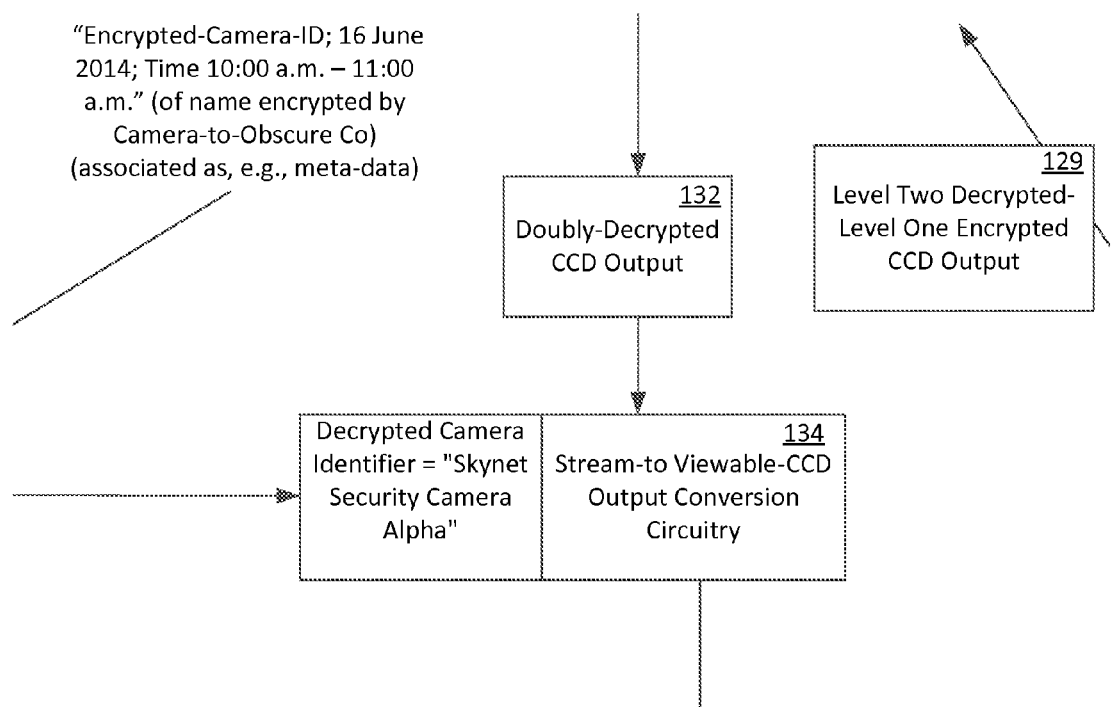
Fig. 9-O

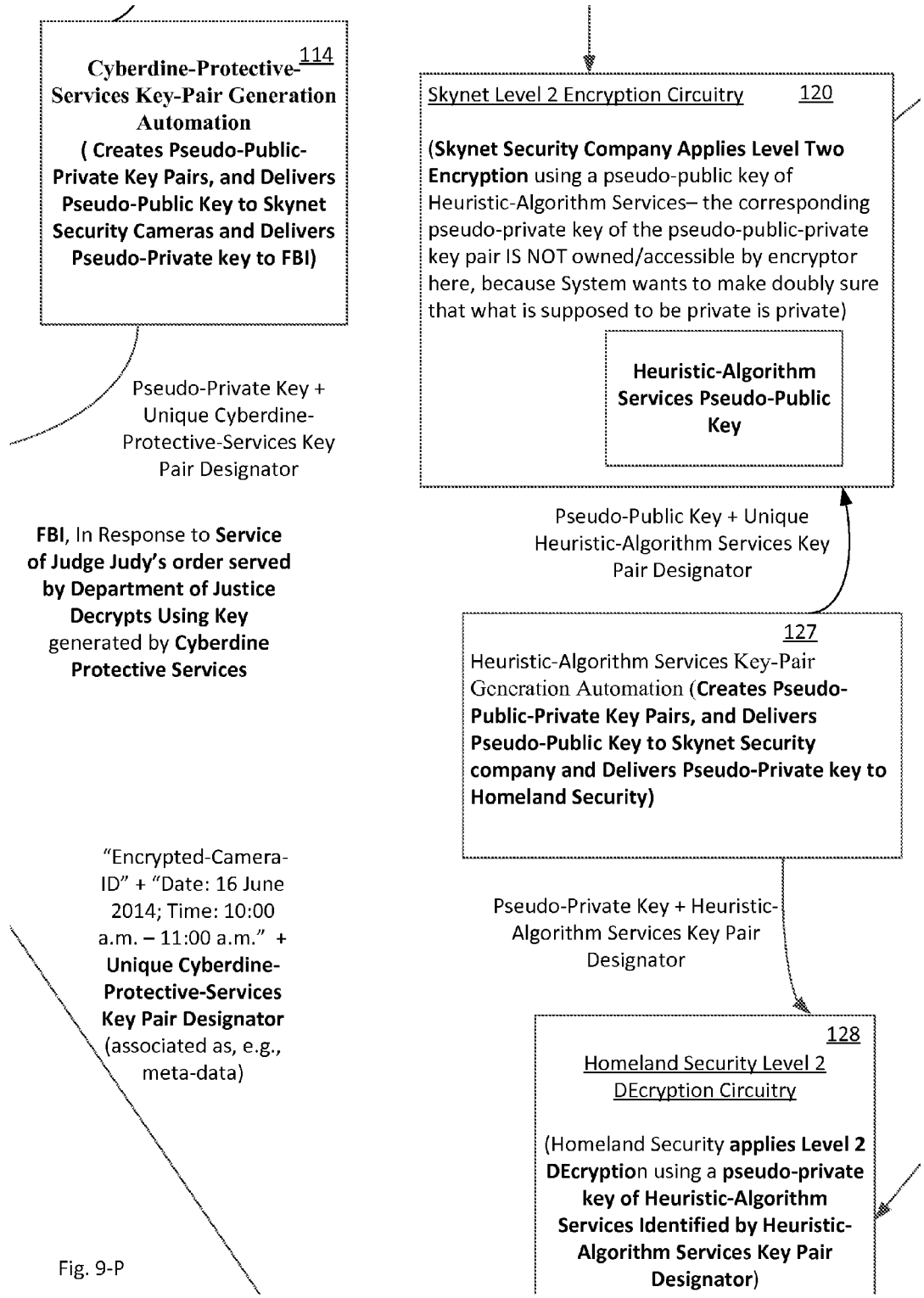
Fig. 9-P

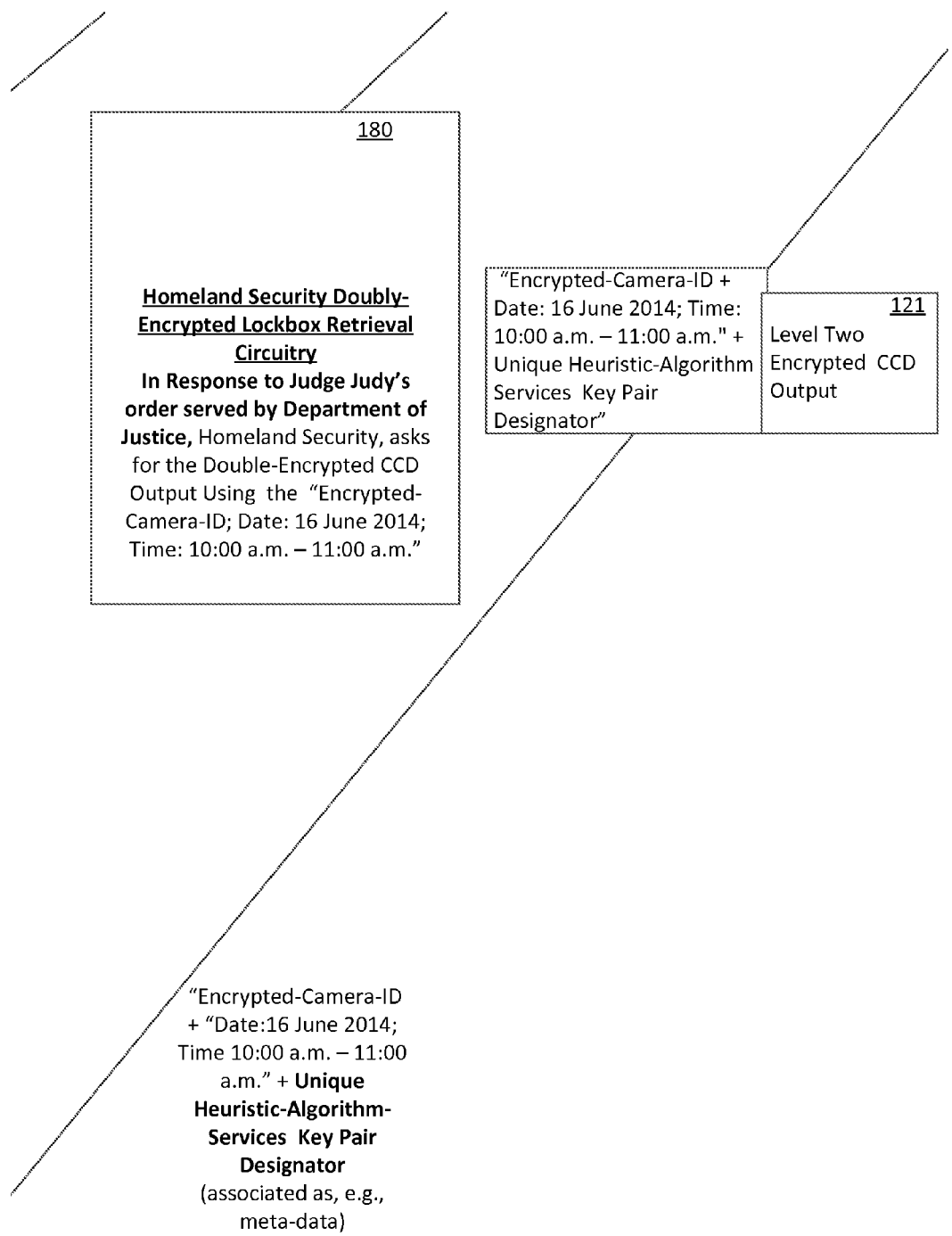
Fig. 9-Q

This page is a partial view of a complete view that is extended over several sheets. This page is included so that there is no loss in facility of understanding the view. See 37 C.F.R. 1.84(h)(2). This page is capable of being linked edge to edge with Fig. 9-Q to the left, no figure to the right, Fig. 9-X below, and Fig. 9-L above.

Fig. 9-R

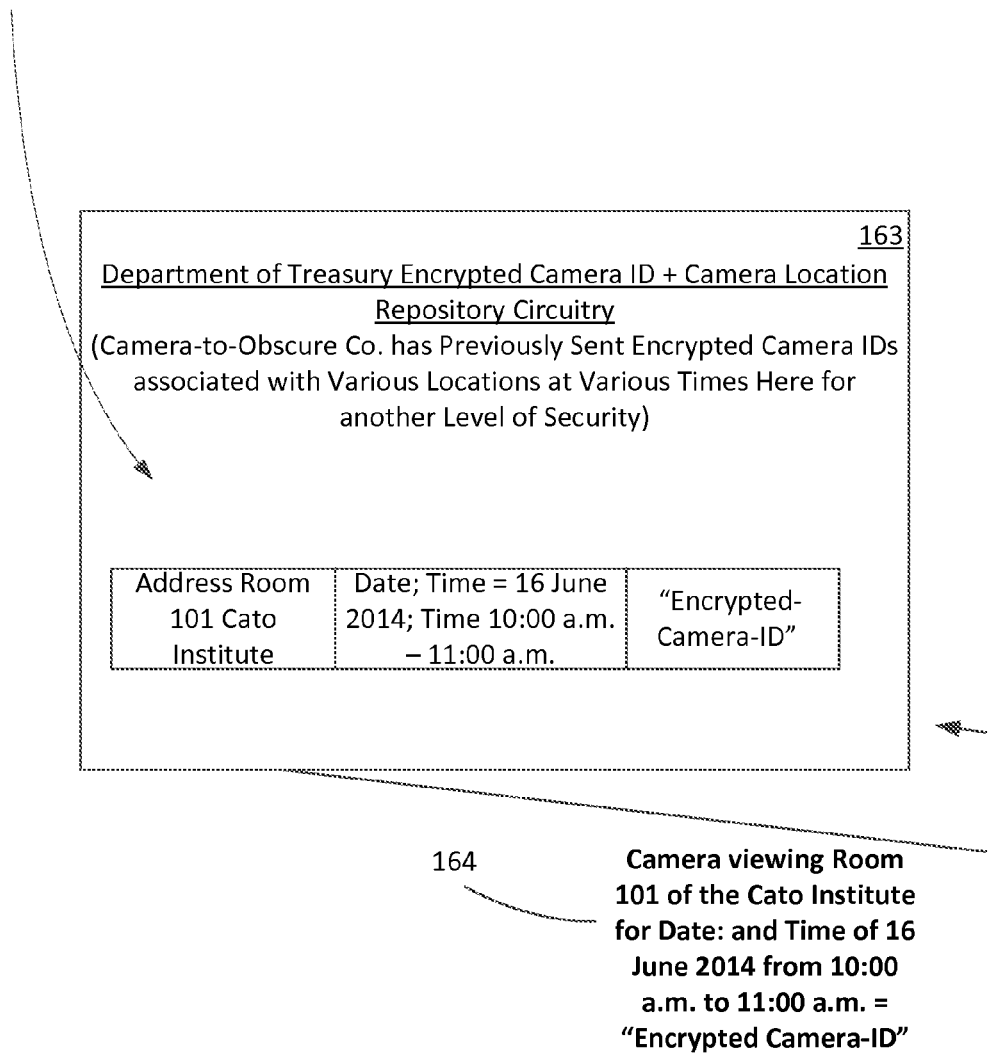
Fig. 9-S

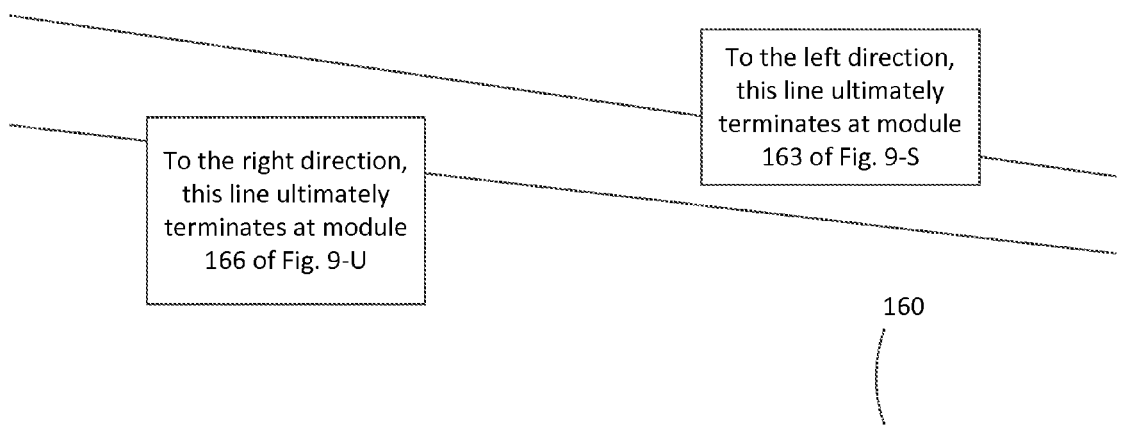
Fig. 9-T

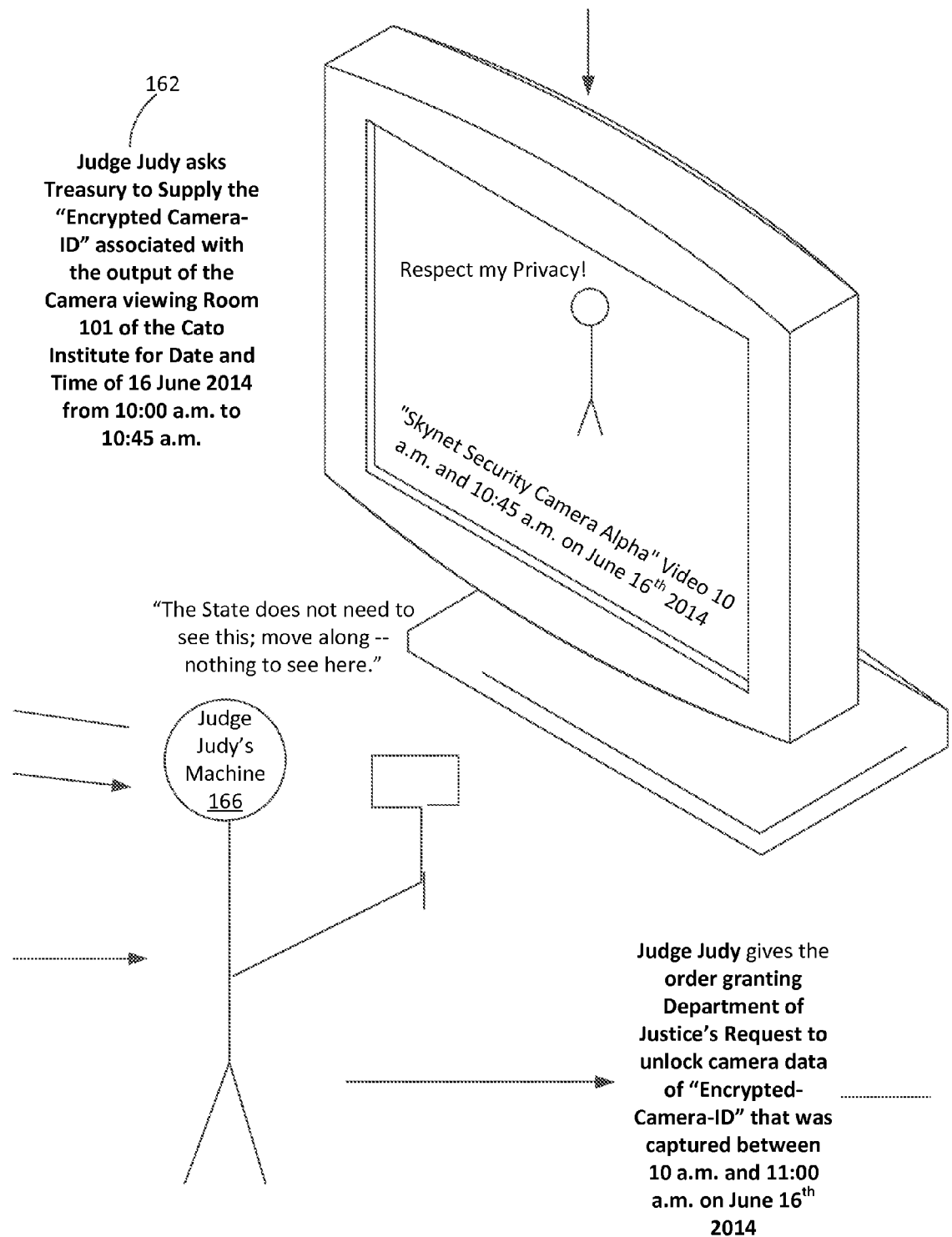
Fig. 9-U

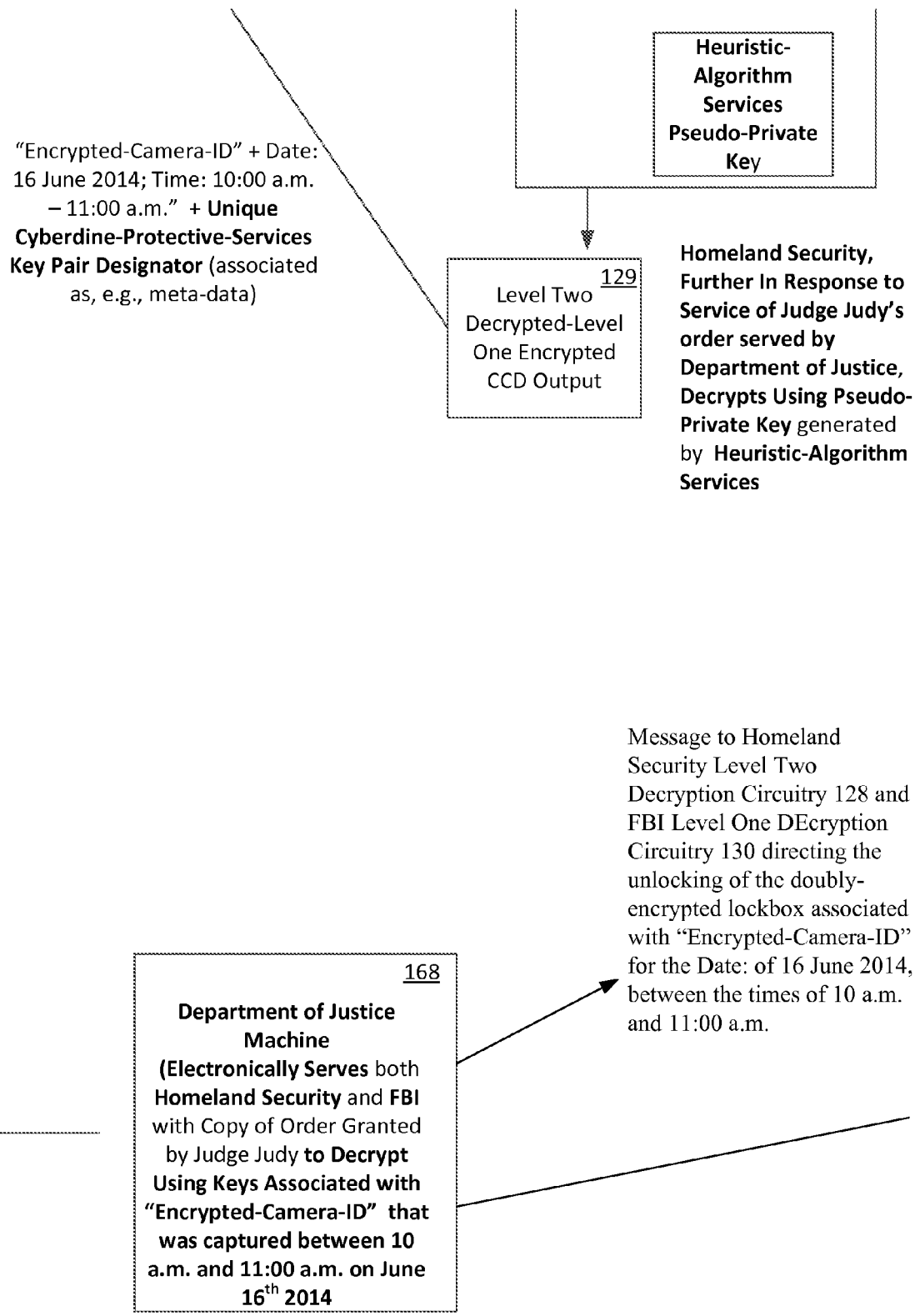
Fig. 9-V message to Homeland Security Doubly-Encrypted Lockbox Retrieval Circuitry 180 directing the retrieval of the doubly-encrypted lockbox associated with "Encrypted-Camera-ID" for the Date: of 16 June 2014, between the times of 10 a.m. and 11:00 a.m.

Note: since people may ask for double encrypted CCD Output days or years after it is captured, there will either need to be tracking/storage of the key pairs for first/second encryptions or cycling of the key pairs.

Fig. 9-W

This page is a partial view of a complete view that is extended over several sheets. This page is included so that there is no loss in facility of understanding the view. See 37 C.F.R. 1.84(h)(2). This page is capable of being linked edge to edge with Fig. 9-W to the left, no figure to the right, no figure below, and Fig. 9-R above.

Fig. 9-X

LEVEL-TWO DECRYPTION ASSOCIATED WITH INDIVIDUAL PRIVACY AND PUBLIC SAFETY PROTECTION VIA DOUBLE ENCRYPTED LOCK BOX

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation-in-part of U.S. patent application Ser. No. 13/385,598 entitled RIGHT OF INDIVIDUAL PRIVACY AND PUBLIC SAFETY PROTECTION VIA DOUBLE ENCRYPTED LOCK BOX, naming Edward K. Y. Jung, Royce A. Levien, Richard T. Lord, Robert W. Lord, and Mark Malamud, as inventors filed 12 Jul. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/653,222 entitled LEVEL-ONE ENCRYPTION ASSOCIATED WITH INDIVIDUAL PRIVACY AND PUBLIC SAFETY PROTECTION VIA DOUBLE ENCRYPTED LOCK BOX, naming Edward K. Y. Jung, Royce A. Levien, Richard T. Lord, Robert W. Lord, and Mark Malamud, as inventors filed 16 Oct. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/660,848 entitled LEVEL-TWO ENCRYPTION ASSOCIATED WITH INDIVIDUAL PRIVACY AND PUBLIC SAFETY PROTECTION VIA DOUBLE ENCRYPTED LOCK BOX, naming Edward K. Y. Jung, Royce A. Levien, Richard T. Lord, Robert W. Lord, and Mark Malamud, as inventors filed 25 Oct. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/707,427 entitled PRE-EVENT REPOSITORY ASSOCIATED WITH INDIVIDUAL PRIVACY AND PUBLIC SAFETY PROTECTION VIA DOUBLE ENCRYPTED LOCK BOX, naming Edward K. Y. Jung, Royce A. Levien, Richard T. Lord, Robert W. Lord, and Mark Malamud, as inventors filed 6 Dec. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/720,360 entitled LEVEL-TWO DECRYPTION ASSOCIATED WITH INDIVIDUAL PRIVACY AND PUBLIC SAFETY PROTECTION VIA DOUBLE ENCRYPTED LOCK BOX, naming Edward K. Y. Jung, Royce A. Levien, Richard T. Lord, Robert W. Lord, and Mark Malamud, as inventors filed 19 Dec. 2012, which is currently co-pending or is an application of which a currently co-pending application is entitled to the benefit of the filing date.

RELATED APPLICATIONS

None

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

In one or more various aspects, a method includes but is not limited to receiving a level-one encrypted output of a surveillance device; decrypting at least a part of the level-one encrypted output of the surveillance device with a level-one decryption key that is practicably inaccessible by a level-one encryption entity; and transmitting a plaintext output of the surveillance device. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, computer programming, and/or firmware configured to effect the herein-referenced method aspects depending upon the design choices of the system designer, and limited to patentable subject matter under 35 USC 101.

In one aspect, a system includes but is not limited to a machine configured to create a physical reality of receiving a level-one encrypted output of a surveillance device; a machine configured to create a physical reality of decrypting at least a part of the level-one encrypted output of the surveillance device with a level-one decryption key that is practicably inaccessible by a level-one encryption entity; and a machine configured to create a physical reality of transmitting a plaintext output of the surveillance device. In addition to the foregoing, other system aspects are described in the claims, drawings, and text forming a part of the disclosure set forth herein.

In addition to the foregoing, various other method and/or system and/or program product aspects are set forth and described in the text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the disclosures set forth herein.

BRIEF DESCRIPTION OF THE FIGURES

In accordance with 37 CFR 1.84(h)(2), FIG. 1 shows "a view of a large machine or device in its entirety . . . broken into partial views . . . extended over several sheets" labeled FIG. 1-A through FIG. 1-X (Sheets 1-24). The "views on two or more sheets form, in effect, a single complete view, [and] the views on the several sheets . . . [are] so arranged that the complete figure can be assembled" from "partial views drawn on separate sheets . . . linked edge to edge," in that (i) a "smaller scale view" is "included showing the whole formed by the partial views and indicating the positions of the parts shown," see 37 CFR 1.84(h)(2), and (ii) the partial-view FIGS. 1-A to 1-X are ordered alphabetically, by increasing column from left to right, as shown in the following table (with further orientation as indicated by tab-slot instructions on the partial-view figures):

Figure 2:
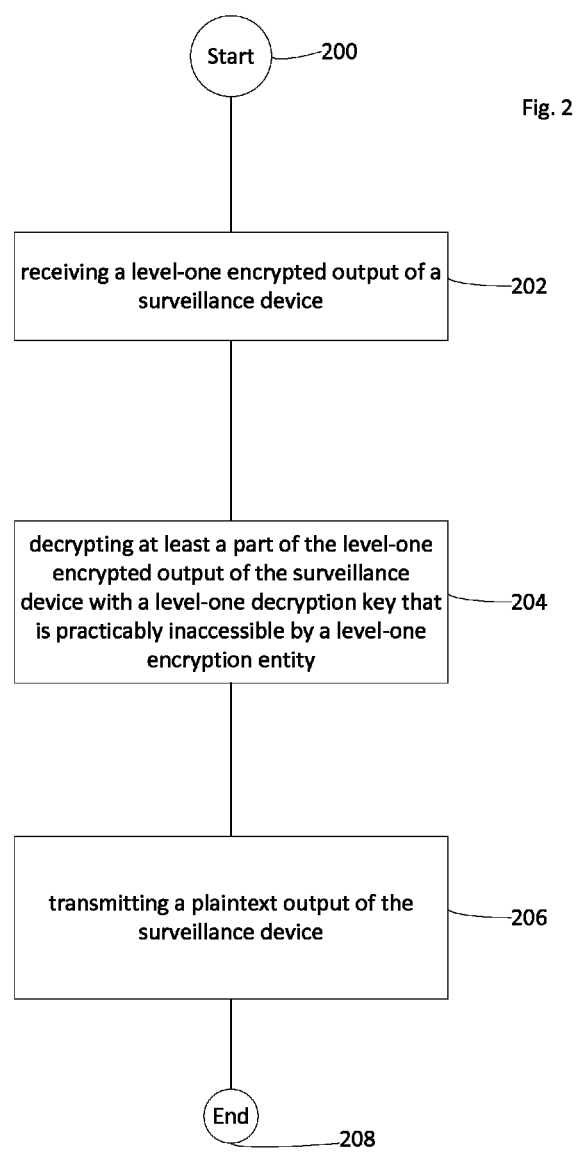

| | | | | | |
|---|---|---|---|---|---|
| FIG. 1-A | FIG. 1-B | FIG. 1-C | FIG. 1-D | FIG. 1-E | FIG. 1-F |
| FIG. 1-G | FIG. 1-H | FIG. 1-I | FIG. 1-J | FIG. 1-K | FIG. 1-L |
| FIG. 1-M | FIG. 1-N | FIG. 1-O | FIG. 1-P | FIG. 1-Q | FIG. 1-R |
| FIG. 1-S | FIG. 1-T | FIG. 1-U | FIG. 1-V | FIG. 1-W | FIG. 1-X |

In accordance with 37 CFR 1.84(h)(2), FIG. 9 depicts "a view of a large machine or device in its entirety . . . broken into partial views . . . extended over several sheets" labeled FIG. 9-A through FIG. 9-X (Sheets 25-48). The "views on two or more sheets form, in effect, a single complete view, [and] the views on the several sheets . . . [are] so arranged that the complete figure can be assembled" from "partial views drawn on separate sheets . . . linked edge to edge," in that (i) a "smaller scale view" is "included showing the whole formed by the partial views and indicating the positions of the parts shown," see 37 CFR 1.84(h)(2), and (ii) the partial-view FIGS. 9-A to 9-X are ordered alphabetically, by increasing column from left to right, as shown in the following table (with further orientation as indicated by tab-slot instructions on the partial-view figures):

| | | | | | |
|---|---|---|---|---|---|
| FIG. 9-A | FIG. 9-B | FIG. 9-C | FIG. 9-D | FIG. 9-E | FIG. 9-F |
| FIG. 9-G | FIG. 9-H | FIG. 9-I | FIG. 9-J | FIG. 9-K | FIG. 9-L |
| FIG. 9-M | FIG. 9-N | FIG. 9-O | FIG. 9-P | FIG. 9-Q | FIG. 9-R |
| FIG. 9-S | FIG. 9-T | FIG. 9-U | FIG. 9-V | FIG. 9-W | FIG. 9-X |

FIGS. 2-8 illustrate system/operational descriptions of implementations.

The use of the same symbols in different drawings typically indicates similar or identical items unless context dictates otherwise.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. As a courtesy to the reader, and with reference now to the accompanying figures herein, in general "100 series" reference numerals will typically refer to items first introduced/described by FIG. 1, "200 series" reference numerals will typically refer to items first introduced/described by FIG. 2, "300 series" reference numerals will typically refer to items first introduced/described by FIG. 3, etc.

The present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

I. Overview: Operational/Functional Language Herein Describes Machines/Machine Control/Machine-Controlled Processes Unless Context Dictates Otherwise The claims, description, and drawings of this application may describe one or more of the instant technologies in operational/functional language, for example as a set of operations to be performed by a computer. Such operational/functional description in most instances would be understood by one skilled in the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human reader. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail herein, these logical operations/functions are not representations of abstract ideas, but rather are representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very High speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct" (e.g., that "software"—a computer program or computer programming—is somehow an ineffable mental construct, because at a high level of abstraction, it can be conceived and understood by a human reader). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of logic, such as Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configurations, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible to most humans. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that useful, tangible, and concrete work is done. For example, as indicated above, such machine language—the compiled version of the higher-level language—functions as a technical specification which selects out hardware logic gates, specifies voltage levels, voltage transition timings, etc., such that the useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality of logic(s), or (d) virtually any combination of the foregoing. Indeed, any physical object which has a stable, measurable, and changeable state may be used to construct a machine based on the above technical description. Charles Babbage, for example, constructed the first mechanized computational apparatus out of wood with the mechanism powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language should not be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

II. Panoptic System and Method Architectures

With reference now to the Figures and with reference now to FIG. 1, FIG. 1 shows a partially schematic diagram of an environment(s) and/or an implementation(s) of technologies described herein. FIG. 1 depicts atypical person 100 resident within the confines of Room 101 of the Cato Institute. FIG. 1 illustrates that Room 101 of the Cato Institute is surveilled by camera 102, where camera 102 has an associated identifier (e.g., name) of "Skynet Security Camera Alpha."

FIG. 1 illustrates that Camera-to-Obscure Co. Circuitry 104 creates a pseudo-public-private key pair. FIG. 1 shows that Camera-to-Obscure Co. Circuitry 104 transmits Camera-to-Obscure Co. generated Pseudo-Public Key to Skynet Name Obscuring Unit 106. FIG. 1 depicts that the output of Skynet Name Obscuring Unit 106 is "Encrypted-Camera-ID" which is a string that results from encrypting "Skynet Security Camera Alpha" with the pseudo-public key delivered to Skynet Name Obscuring Unit 106 by Camera-to-Obscure Co. Circuitry 104. FIG. 1 further depicts that Camera-to-Obscure Co. Circuitry 104 transmits Camera-to-Obscure Co. generated Pseudo-Private Key to FBI Name DE-Obscuring Circuitry 136, which as show herein, in one implementation, will subsequently attempt to unlock various received encrypted names by trying to decrypt the received encrypted names via trying various pseudo-private keys on the FBI Name DE-Obscuring Circuitry 136's private key chain until the encrypted name is unlocked; that is, in a fashion analogous to a human trying similar looking keys on his key chain to find the key that opens the front door to his house. In other implementations FBI Name DE-Obscuring Circuitry 136 uses a Unique Camera-to-Obscure Co. Key pair designator (not shown), analogous to the ways unique key pair designators are used as described elsewhere herein with respect to, for example, the pseudo-public-private key pairs respectively generated by Cyberdine Protective Services and Heuristic Algorithm Services such as described herein; such alternate implementations for the FBI Name DE-Obscuring Circuitry 136 that use a Unique Camera-to-Obscure Co. Key pair designator are not shown in the drawings for sake of clarity but can be understood in light of at least the reference examples herein.

FIG. 1 illustrates that Skynet Name Obscuring Unit 106 transmits output—"Encrypted-Camera-ID"—which is the string that is the result of encrypting "Skynet Security Camera Alpha" with the pseudo-public key of the pseudo-public-private key pair generated by Camera-to-Obscure Co. circuitry 104—plus a date and time window for which "Encrypted-Camera ID" is good (e.g., 16 Jun. 2014 from 10:00 a.m. to 11:00 a.m.) to Skynet Level One Encryption Circuitry 110. In some implementations, the date and time is optional, and Skynet Level One Encryption Circuitry 110 just appends the appropriate date and time during which CCD output 112 is received from camera 102.

FIG. 1 shows that in one implementation CCD output 112 from camera 102 feeds—via a hardwired connection—directly into Skynet Level One Encryption Circuitry 110 as a stream—not a frame. Thus, in one implementation such as illustrated herein, at no point can camera 102's output be intelligibly accessed until/unless several different legal entities—controlling very different encryption/decryption automation the keys to which encryption/decryption are at no time held by a single party who can decrypt and see the camera output—work in a transparent and coordinated fashion. FIG. 1 shows atypical person 100 (e.g., one with an alternative lifestyle) who just wants to be left alone but is aware that camera 102—"Skynet Security Camera Alpha"—is surveilling Room 101 of the Cato Institute where atypical person 100 is resident. Accordingly, atypical person 100 is depicted as saying "respect my privacy, and keep your intrusive cameras off my body!"

In one implementation, the public safety is served by constant camera surveillance of Room 101 of the Cato Institute, but atypical person 100 has legitimate concerns as to how such surveillance data might be used. To allay atypical person 100's concerns, illustrated is that CCD output 112 of camera 102 is clocked directly into Skynet Level One Encryption Circuitry 110 as a stream (e.g., such that it can't typically be viewed as video data), which in one implementation immediately encrypts the stream of CCD output 112 using a pseudo-public key generated by Cyberdine-Protective-Services Key-Pair Generation Automation 114.

Continuing to refer to FIG. 1, illustrated is that Cyberdine-Protective-Services Key-Pair Generation Automation 114 creates pseudo-public-private key pairs. Shown is that Cyberdine-Protective-Services Key-Pair Generation Automation 114 delivers the pseudo-public key along with a Unique Cyberdine-Protective-Services Key Pair Designator to Skynet Level One Encryption Circuitry 110 (as show herein Unique Cyberdine-Protective-Services Key Pair Designator will ultimately be utilized to coordinate the pseudo-public and pseudo-private keys by two different and unique legal entities; that is, the unique designator will allow different entities, which are "blind" to the pairing of the pseudo-public and pseudo-private keys, to subsequently use the correct pseudo-private key to decrypt that which was encoded with the corresponding pseudo-public key). Skynet Level One Encryption Circuitry 110 is depicted as under the legal control and administration of Skynet Security Company. FIG. 1 shows that Cyberdine-Protective-Services Key- Pair Generation Automation 114 delivers the pseudo-private key along with a unique Cyberdine-Protective-Services Key Pair Designator which serves to identify the pseudo-public-private key pair of which the pseudo-private key forms a part to Federal Bureau of Investigation ("FBI") Level One DEcryption Circuitry 130.

FIG. 1 illustrates that while Cyberdine Protective Services has legal control and administration of both keys of the pair, as well as the Cyberdine-Generated Unique Key Pair Designator which serves to identify/coordinate the key pair, Cyberdine Protective Services does not have access to CCD output 112 of camera 102. FIG. 1 shows that when Skynet Level One Encryption Circuitry 110 encrypts CCD output 112 of camera 102 with the Cyberdine-Security-Services generated pseudo-public key, Skynet has no legal control, administration, or possession of the corresponding Cyberdine-Security-Services generated pseudo-private key which could be used to unlock the encryption of CCD output 112 of camera 102 that was/is instantiated by Skynet Level One Encryption Circuitry 110. Cyberdine-Protective-Services Key-Pair Generation Automation 114 is depicted as under the legal control and administration of Cyberdine Protective Services Company which is separate and apart from Skynet Security Company.

FIG. 1 illustrates that the system ensures that Skynet Security Company cannot see any image because it only holds the pseudo-public key of a pseudo-public-private key pair that has been generated by another legal entity, Cyberdine Protective Services Company.

FIG. 1 shows that, in one implementation, Skynet Level One Encryption Circuitry 110, after receipt of "Encrypted-Camera-ID" which is the string that is result of encrypting "Skynet Security Camera Alpha" plus a date and time window for which "Encrypted-Camera ID" is good (e.g., 16 Jun. 2014 from 10:00 a.m. to 11:00 a.m.) from Skynet Name Obscuring Unit 106, encrypts CCD output 112 of camera 102 that occurred on 16 Jun. 2014 from 10:00 a.m. to 11:00 a.m. via the pseudo-public key of the pseudo-public-private key pair generated by Cyberdine Protective Services Company. Thereafter, illustrated is that Skynet Level One Encryption Circuitry 110 associates the Level One encryption of CCD output 112 of camera 102 with meta-data composed of "'Encrypted-Camera-ID"+"Date: 16 Jun. 2014; Time: 10:00 a.m.-11:00 a.m."+"Unique Cyberdine-Protective-Services Key Pair Designator.'" In the instance shown, the "'Encrypted-Camera-ID"+"Date: 16 Jun. 2014; Time: 10:00 a.m.-11:00 a.m."+"Unique Cyberdine-Protective-Services Key Pair Designator'" meta-data is kept outside the Level One encryption applied by Skynet Level One Encryption Circuitry 110, but those skilled in the art will appreciate that in other implementations all or part of such meta-data may be emplaced inside the Level One encryption.

FIG. 1 shows that, subsequently, Skynet Level One Encryption Circuitry 110 sends Level One encrypted CCD output 118, and its associated meta-data of 'Encrypted-Camera-ID"+"Date: 16 Jun. 2014; Time: 10:00 a.m.-11:00 a.m."+"Unique Cyberdine-Protective-Services Key Pair Designator'" to Skynet Level Two Encryption Circuitry 120. FIG. 1 depicts that upon receipt of Level One Encrypted CCD output 118, Skynet Level Two Encryption Circuitry 120 encrypts the received Level One Encrypted CCD output 118 as well as its associated meta-data of "'Encrypted-Camera-ID"+"Date: 16 Jun. 2014; Time: 10:00 a.m.-11:00 a.m."+"Unique Cyberdine-Protective-Services Key Pair Designator'" using a pseudo-public key of a pseudo-public-private key pair that has been generated by another legal entity, Heuristic-Algorithm Services, thus creating a Level Two encryption of Level One Encrypted CCD output 118. With reference now back to CCD output 112 of camera 102 at this point FIG. 1 shows that the Level Two encryption of Level One Encrypted CCD output 118 is a doubly-encrypted version of CCD output 112 of camera 102.

FIG. 1 illustrates that the system ensures that Skynet Level Two Encryption Circuitry 120 can only encrypt because it holds only the pseudo-public key of a pseudo-public-private key pair that has been generated by yet another legal entity, Heuristic-Algorithm Services. FIG. 1 shows that Heuristic-Algorithm Services also generates a "Unique Heuristic-Algorithm-Services Key Pair Designator" that will subsequently be used to "pair" the correct pseudo-private key with the correct pseudo-public key by separate legal entities that are effectively "blind" to the pairing done by Heuristic-Algorithm Services. As shown herein, the pseudo-public-private key pairs and the Unique Heuristic-Algorithm-Services Key Pair Designator are generated by Heuristic-Algorithm-Services Key Pair Generation Automation 127, which is under the legal control and administration of Heuristic-Algorithm Services Company.

Illustrated is that Skynet Security Level Two Encryption Circuitry 120 thereafter associates the meta-data of "'Encrypted-Camera-ID"+"Date: 16 Jun. 2014; Time: 10:00 a.m.-11:00 a.m."+"Unique Heuristic-Algorithm-Services Key Pair Designator'" with the Level Two Encrypted CCD output 121.

Thereafter, illustrated is that Skynet Security Level Two Encryption Circuitry 120 sends the Level Two encrypted CCD output 121, having associated meta-data of "'Encrypted-Camera-ID"+"Date: 16 Jun. 2014; Time: 10:00 a.m.-11:00 a.m."+"Unique Heuristic-Algorithm-Services Key Pair Designator'" to PreCrime Repository 122. The neologism "PreCrime" is used herein for sake of illustration, and may be understood as representative of a "pre-event-of-interest" concept.

Shown is that PreCrime Repository Double-Locked Box Storage Engine 124 receives the Level Two Encrypted CCD Output 121, having associated meta-data of "'Encrypted-Camera-ID"+"Date: 16 Jun. 2014; Time: 10:00 a.m.-11:00 a.m."+"Unique Heuristic-Algorithm-Services Key Pair Designator'" which is then stored as a doubly-encrypted CCD output lockbox indexed by some or all of its meta-data (e.g., indexed by some or all of "'Encrypted-Camera-ID"+"Date: 16 Jun. 2014; Time: 10 a.m.-11:00 a.m."+"Unique Heuristic-Algorithm-Services Key Pair Designator'"). In alternate implementations Level Two Encrypted CCD Output 121 is indexed by "Encrypted-Camera-ID" alone, while in other alternate implementations the Level Two encrypted data is indexed by "Unique Heuristic-Algorithm-Services Key Pair Designator" alone, but FIG. 1 shows meta-data of "'Encrypted-Camera-ID"+"Date: 16 Jun. 2014; Time: 10:00 a.m.-11:00 a.m."+"Unique Heuristic-Algorithm-Services Key Pair Designator'" being used to index for sake of clarity.

It is expected that, in a free society in most instances the doubly-encrypted version of CCD output 112 of camera 102 (e.g., Level Two Encrypted CCD Output 121) will never be retrieved and decrypted. That said, it is expected that in some instances public safety might demand that the doubly-encrypted version of CCD output 112 of camera 102 be retrieved and decrypted. For sake of illustration, such an example will now be discussed.

Referring now to the lower left corner of FIG. 1, FIG. 1 depicts, for sake of example, Judge Judy acting subsequent to the event of a crime (e.g., a terrorist attack) committed in the vicinity of Room 101 of the Cato Institute at some time between 10:00 a.m. and 10:45 a.m. on 16 Jun. 2014. FIG. 1 illustrates the Department of Justice asking 160 Judge Judy to issue an order for the unlocking of the camera output from 10:00 a.m. and 10:45 a.m. on 16 Jun. 2014 that is associated with a view of Room 101 of the Cato Institute at the time in question. At this point, neither the Department of Justice nor Judge Judy has a name identifying the camera in question. In response, FIG. 1 shows Judge Judy's machine 166 asking 162 the Department of Treasury Encrypted Camera ID+Camera Location Repository Circuitry 163 (Camera-to-Obscure Co and/or Skynet Security Company is shown as having delivered such information to Treasury at or around the time of such output's creation) for the "Encrypted-Camera-ID" that is associated with the camera that was viewing Room 101 of the Cato Institute on the date of 16 Jun. 2014, between the times of 10:00 a.m. and 10:45 a.m.

In response, FIG. 1 shows the Department of Treasury Encrypted Camera ID+Camera Location Repository Circuitry 163 transmitting 164 to Judge Judy's machine 166 the "Encrypted-Camera-ID" that is associated with the camera at Room 101 of the Cato Institute for the date of 16 Jun. 2014, between the times of 10:00 a.m. and 10:45 a.m. (e.g. the output of camera 102 from 10:00 a.m. to 11:00 a.m. that the system stored). FIG. 1 depicts that Skynet Name Obscuring Unit 106 is shown as having transmitted to Department of Treasury Encrypted Camera ID+Camera Location Repository Circuitry 163 the "Encrypted-Camera-ID" that is associated with the camera having geographic location of Room 101 of the Cato Institute for the date of 16 Jun. 2014, and between the times of 10:00 a.m. and 11:00 a.m. at or around the time "Encrypted Camera ID" was created. That is, at some point prior to Judge Judy's machine 166 making the request.

FIG. 1 depicts that, subsequent to receiving "Encrypted-Camera-ID" that is associated with the camera that was surveilling Room 101 of the Cato Institute on the date of 16 Jun. 2014, and between the times of 10:00 a.m. and 11:00 a.m. (the encrypted envelope that holds the time of interest of 10:00 a.m. to 10:45 a.m.), Judge Judy's machine 166 transmits to Department of Justice Machine 168 an order directing that the output of "Encrypted-Camera-ID" associated with the camera at Room 101 of the Cato Institute for the date of 16 Jun. 2014, between the times of 10:00 a.m. and 11:00 a.m. be unlocked. FIG. 1 illustrates that Department of Justice Machine 168 transmits messages to Homeland Security Doubly-Encrypted Lockbox Retrieval Circuitry 180, Homeland Security Level Two DEcryption Circuitry 128, and FBI Level One DEcryption Circuitry 130 directing the retrieval and/or unlocking of the doubly-encrypted lockbox associated with "Encrypted-Camera-ID" for the date of 16 Jun. 2014, between the times of 10:00 a.m. and 11:00 a.m.

Referring now to the approximate middle-right portion of FIG. 1, FIG. 1 illustrates that, in response to Judge Judy's order the content of which was relayed through the message of Department of Justice Machine 168, Homeland Security Doubly-Encrypted Lockbox Retrieval Circuitry 180 asks PreCrime Repository Circuitry 122 for the files indexed by "'Encrypted-Camera-ID"; "Date: 16 Jun. 2014; Time: 10:00 a.m.-11:00 a.m.'" More specifically, FIG. 1 shows that Homeland Security Doubly-Encrypted Lockbox Retrieval Circuitry 180 transmits a request for the double-encrypted lockbox files having index of "'Encrypted-Camera-ID"+ "Date: 16 Jun. 2014; Time: 10:00 a.m.-11:00 a.m.'" to PreCrime Repository Doubly-Encrypted CCD Output Retriever Engine 126.

FIG. 1 depicts PreCrime Repository Doubly-Encrypted CCD Output Retriever Engine 126 pulling the doubly-encrypted files indexed by "'Encrypted-Camera-ID"+Date: 16 Jun. 2014; Time: 10:00 a.m.-11:00 a.m.+"Unique Heuristic-Algorithm Services Key Pair Designator'" from within PreCrime Repository 122. FIG. 1 illustrates that thereafter PreCrime Repository Doubly-Encrypted CCD Output Retriever Engine 126 sends Level Two Encrypted CCD output 121 along with the associated meta-data of "'Encrypted-Camera-ID"+"Date: 16 Jun. 2014; Time: 10:00 a.m.-11:00 a.m."+"Unique Heuristic-Algorithm Services Key Pair Designator'" to Homeland Security Level Two DEcryption Circuitry 128, which, in view of Judge Judy's order, upon receipt decrypts the received Level Two Encrypted CCD output 121 with the correct pseudo-private key generated by Heuristic Algorithm Services. In one implementation, Homeland Security Level Two DEcryption Circuitry 128 is able to retrieve the correct pseudo-private key to do the decryption via use of Unique Heuristic-Algorithm-Services Key Pair Designator which was previously delivered—by Heuristic-Algorithm Services Key-Pair Generation Automation 127—to Homeland Security Level Two DEcryption Circuitry 128 in association with the pseudo-private key that unlocks the corresponding pseudo-public key that was previously used by Skynet Level Two Encryption Circuitry 120 to encrypt as described herein. Thus, in one implementation Unique Heuristic-Algorithm-Services Key Pair Designator is used to retrieve the correct decryption key, even though the decryptor never had possession/control of the Heuristic-Algorithm pseudo-public key that was used to encrypt.

FIG. 1 shows that Homeland Security Level Two DEcryption Circuitry 128 uses the pseudo-private encryption key of Heuristic-Algorithm Services that is identified by Unique Heuristic-Algorithm-Services Key Pair Designator—which accompanies the doubly encrypted lockbox as meta-data—to undo the Level Two encryption that was previously instantiated by Skynet Level Two Encryption Circuitry 120. Depicted is that in one implementation the decryption yields the Level-Two Decrypted-Level One Encrypted CCD output data 129 (e.g., the Level Two Decryption applied by Skynet Level Two Encryption Circuitry 120 has been unlocked but the data is still encrypted via the Level One encryption previously applied by Skynet Level One Encryption Circuitry 110) and further depicted is that the decryption done by Homeland Security Level Two Decryption Circuitry 128—accomplished via retrieval of the correct key identified by the Unique Heuristic-Algorithm Services Key Pair Identifier—also provides as output the successful decryption of the Unique Cyberdine-Protective-Services Key Pair Designator (which as shown herein had previously been encrypted by Skynet Level Two Encryption Circuitry 120). FIG. 1 depicts that thereafter Homeland Security Level Two DEcryption Circuitry 128 associates as meta-data "'Encrypted-Camera-ID"+Date: 16 Jun. 2014; Time: 10:00 a.m.-11:00 a.m."+"Unique Cyberdine-Protective-Services Key Pair Designator'" with the Level-Two Decrypted-Level One Encrypted CCD output data 129 (which is still encrypted via the level one encryption previously applied by Skynet Level One Encryption Circuitry 110). FIG. 1 illustrates that Homeland Security Level Two DEcryption Circuitry 128 thereafter sends the meta-data "'Encrypted-Camera-ID"+"Date: 16 Jun. 2014; Time: 10:00 a.m.-11:00 a.m."+"Unique Cyberdine-Protective-Services Key Pair Designator'" in association with the with the Level Two Decrypted-Level One Encrypted CCD output data 129 (which is still encrypted via the level one encryption previously applied by Skynet Level One Encryption Circuitry 110) to FBI Level One Decryption Circuitry 130.

FIG. 1 shows that, FBI Level One DEcryption Circuitry 130 receives the meta-data "'Encrypted-Camera-ID'+ "Date: 16 Jun. 2014; Time 10:00 a.m.-11:00 a.m."+"Unique Cyberdine-Protective-Services Key Pair Designator'" in association with the Level-Two Decrypted-Level One Encrypted CCD output data 129 (which is still encrypted via the level one encryption previously applied by Skynet Level One Encryption Circuitry 110). FIG. 1 depicts that FBI Level One DEcryption Circuitry 130 determines that Judge Judy's order, as related through the message of Department of Justice Machine 168, indicates that the data associated with "Encrypted-Camera-ID" is to be unlocked. Accordingly, FIG. 1 illustrates that FBI Level One DEcryption Circuitry 130 uses the received Unique Cyberdine-Protective-Services Key Pair Designator to retrieve the correct Cyberdine-Protective-Services pseudo-private key that corresponds to the Cyberdine-Protective-Services pseudo-public key that Skynet Level One Encryption Circuitry 110 used to encrypt CCD Output 112. FIG. 1 shows that FBI Level One DEcryption Circuitry 130 uses the retrieved Cyberdine-Protective-Services pseudo-private key to unlock the Level One encryption. Thus, FIG. 1 shows FBI Level One DEcryption Circuitry 130 outputting doubly-decrypted CCD output 132 (e.g., the in-the-clear stream of CCD output 112 of camera 102).

FIG. 1 depicts that Stream-to Viewable-CCD Output Conversion Circuitry 134 converts the stream to viewable CCD output (e.g., still or motion image frames) which is securely displayed in Judge Judy's chambers. Depicted is that for an additional level of citizen's right's protection, "Encrypted-Camera-ID" is sent by FBI Level One DEcryption Circuitry 130 to FBI Name DE-Obscuring Circuitry 136 which then, using a pseudo-private key of a pseudo-public-private key pair generated by software created by Camera-to-Obscure Co., decrypts "Encrypted-Camera-ID" to "Skynet Security Camera Alpha" which is then used by Stream-to Viewable-CCD Output Conversion Circuitry 134 to associate the name of the camera with the viewable CCD output.

FIG. 1 illustrates Judge Judy in her Chambers viewing the output of "Skynet Security Camera Alpha" Video of 10:00 a.m. to 10:45 a.m. that was captured on 16 Jun. 2014. Depicted is that Judge Judy determines that atypical person 100 has done nothing wrong, and concludes that the Department of Justice need not see the output. Thus, FIG. 1 shows Judge Judy denying the Department of Justice's request to see the output of the camera viewing Room 101 of the Cato Institute for the date of 16 Jun. 2014 and time from 10:00 a.m. to 10:45 a.m.

Thus as shown herein, atypical citizen 100's rights to privacy, as well as the public's right to safety, are thus protected and/or balanced by the disclosed technologies.

III. Synoptic System and Method Architectures

FIG. 9 depicts a partially schematic diagram of an environment(s) and/or an implementation(s) of technologies described herein. The components of FIG. 9 are described in context herein.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

As a courtesy to the reader, and with reference now to the accompanying figures herein, in general "100 series" reference numerals will typically refer to items first introduced/described by FIG. 1, "200 series" reference numerals will typically refer to items first introduced/described by FIG. 2, "300 series" reference numerals will typically refer to items first introduced/described by FIG. 3, etc.

Referring now to FIG. 2, FIG. 9, and FIG. 1, such figures depict system/operational descriptions of implementations. Operation 200 shows the start of the depiction of the system/operational implementations. Operation 202 illustrates receiving a level-one encrypted output of a surveillance device (e.g., receiving (e.g., via FBI Level One Decryption Circuitry 130) a level-one encrypted output of a surveillance device (e.g., Level-Two Decrypted/Level One Encrypted CCD output 129 of camera 102 that is received from Homeland Security Level Two DEcryption Circuitry 128)). Operation 204 shows decrypting at least a part of the level-one encrypted output of the surveillance device with a level-one decryption key that is practicably inaccessible by a level-one encryption entity (e.g., decrypting (e.g., via Level One Sighted DEcryption Circuitry E100 of FBI Level One Decryption Circuitry 130) at least a part of the output of the level-one encrypted output of the surveillance device (e.g., at least a part of Level-Two Decrypted/Level One Encrypted CCD output 129 of camera 102) with a level-one decryption key that is practicably inaccessible by a level-one encryption entity (e.g., Cyberdine-Protective-Services Pseudo-Private key E102 which could be a DEcryption key that can be used to DEcrypt at least a part of Level-Two Decrypted/Level One Encrypted CCD output 129 of camera 102 of which Skynet Level One Encryption Circuitry 110 has/had no knowledge when it encrypted with the corresponding encryption key (e.g., Cyberdine-Protective-Services Pseudo-Public Encryption Key) and for which there is no practicable way by which Skynet Level One Encryption Circuitry 110 (or its owner/administrator Skynet) can obtain such unlocking key; that is, a companion decryption key to that encryption key that gave Skynet Level One Encryption Circuitry 110 the ability to encrypt but without having given Skynet Level One Encryption Circuitry 110 the ability to decrypt that which it has encrypted)). 7Operation 206 depicts transmitting a plaintext output of the surveillance device (e.g., transmitting (e.g., via Level One Decrypted Transmission Circuitry E104 of FBI Level One DEcryption Circuitry 130) a level-one DEcrypted output of the surveillance device (e.g., Doubly-Decrypted CCD output 132, which in the described example is what is exposed when the level-one encryption is unwrapped)).

Operation 208 shows the end of the depiction of the system/operational descriptions of implementations.

Referring now to FIG. 3, FIG. 2, FIG. 9, and FIG. 1, such figures illustrate system/operational descriptions of implementations. FIG. 3 shows that operation 202—receiving a level-one encrypted output of a surveillance device—may include a number of alternate/additional component operations. Operation 300 depicts accepting an output of level-two decryption circuitry (e.g., accepting (e.g., via FBI Level One DEcryption Circuitry 130) an encrypted output of a surveillance device (e.g., a level one encrypted version, earlier created by Skynet Level One Encryption Circuitry 110 and subsequently stored, after a double encryption by Homeland Security Level Two Encryption Circuitry 120, by PreCrime Repository Double-Locked Box Storage Engine 124 within the circuitry of PreCrime Repository 122), of at least a part of an image capture portion (e.g., video capture of camera 102) or an audio surveillance portion (e.g., a sound capture portion of camera 102) that is sent by Homeland Security Level Two DEcryption Circuitry 128).

Operation 302 illustrates accepting a level-one encrypted version of an output of at least one of an image surveillance device, an audio surveillance device, a motion surveillance device, or a tactile surveillance device (e.g., accepting (e.g., via FBI Level One DEcryption Circuitry 130) via the intermediaries of at least Pre-Crime Repository 122 and Homeland Level Two Decryption Circuitry 128 an output (e.g., digital or analog data) of Homeland Security Level Two DEcryption Circuitry 128 that constitutes a level-two decrypted-level-one encrypted version of at least one of an image surveillance device (e.g., a video capture portion of camera 102), an audio surveillance device (e.g., an audio capture portion of camera 102), a motion surveillance device (e.g., a commercially available motion detector (not shown)) or a tactile surveillance device (e.g., a commercially available vibration detector (not shown))).

Operation 304 shows accepting the level-one encrypted output of the surveillance device in a form such that the level-one encrypted output of the surveillance device is substantially unusable absent combination with other information not present in the level-one encrypted output of the surveillance device (e.g., accepting (e.g., via FBI Level One DEcryption Circuitry 130) the level-one encrypted output of the surveillance device (e.g., level-two DEcrypted-level-one CCD output 129 of camera 102) in a form such that the output of the surveillance device is substantially unusable absent combination with other information not present in the output of the surveillance device (e.g., as described in relation to FIGS. 1 and/or 9 FBI Level One DEcryption Circuitry 130 may accept from Homeland Security Level-Two Encryption Circuitry 128 a packet having an encrypted output of a surveillance device (e.g., level-two DEcrypted-level-one CCD output 129 of camera 102) that is substantially unusable absent the decryption key (e.g., Cyberdine-Protective-Services Pseudo-Private Decryption Key E102) that would unlock the encryption key (e.g., Cyberdine-Protective-Services Pseudo-Public Encryption Key) that was used to create an encrypted output of the surveillance device (e.g., used by Skynet Level-One Encryption Circuitry 110 to produce Level-One encrypted CCD output 118 of camera 102))). Other operations of FIG. 3 depict other system/operational descriptions of implementations as described herein.

Referring now to FIG. 4, FIG. 3, FIG. 9, and FIG. 1, such figures illustrate system/operational descriptions of implementations. FIG. 4 shows that operation 304—accepting the level-one encrypted output of the surveillance device in a form such that the level-one encrypted output of the surveillance device is substantially unusable absent combination with other information not present in the level-one encrypted output of the surveillance device—may include a number of alternate/additional component operations. Operation 400 depicts accepting an output of level-two encryption circuitry, the output associated with a level-one encryption which cannot practicably be decrypted by a level-one encryption entity (e.g., as described in relation to FIG. 1 and/or FIG. 9 FBI Level One Decryption Circuitry 130 may accept an encrypted output of a surveillance device (e.g., level-two DEcrypted-level-one CCD output 129 of camera 102) that is substantially unusable absent the decryption key (e.g., Cyberdine-Protective Services Pseudo-Private DEcryption Key E102) that would unlock the encryption key (e.g., Cyberdine-Protective-Services Pseudo-Public Encryption Key) used to create the encrypted output of the surveillance device (e.g., level-one encrypted CCD output 118 of camera 102; furthermore, as described herein Skynet Level-One Encryption Circuitry 110 encrypts with an encryption key (e.g., Cyberdine-Protective-Services Pseudo-Public Encryption Key) the paired decryption key of which Skynet Level-One Encryption Circuitry 110 has no practicable way of obtaining in that—Cyberdine-Protective Services Key-Pair Generation Automation 114 actively withholds the decryption key (e.g., paired Cyberdine-Protective-Services Pseudo-Private Decryption Key E102) from Skynet Level One Encryption Circuitry 110).

Operation 402 illustrates accepting an output of level-two encryption circuitry, the output associated with a level-one key-pair generation entity (e.g., as described herein FBI Level One DEcryption Circuitry 130 may accept from Homeland Security Level Two Decryption Circuitry 128 a data block having Level One Encrypted CCD Output that Skynet Level One Encryption Circuitry 110 had earlier produced by encrypting with an encryption key (e.g., Cyberdine-Protective-Services Pseudo-Public Encryption Key) the paired decryption key of which Skynet Level One Encryption Circuitry 110 has no practicable way of obtaining in that Cyberdine-Protective Services Key-Pair Generation Automation 114 actively withholds the decryption key (e.g., paired Cyberdine-Protective-Services Pseudo-Private Decryption Key) from Skynet Level One Encryption Circuitry 110; furthermore, as also described herein,—Cyberdine-Protective Services Key-Pair Generation Automation 114 creates a pseudo-public-private key pair, where the pseudo-public key is delivered—along with a Cyberdine-Protective-Services Unique Key-Pair Designator—to Skynet Level One Encryption Circuitry 110 and where the corresponding pseudo-private key (e.g., paired Cyberdine-Protective-Services Pseudo-Private Decryption Key) is delivered—along with the Cyberdine-Protective-Services Unique Key-Pair Designator—to FBI Level One DEcryption circuitry 130).

Operation 404 illustrates that operation 402—accepting an output of level-two encryption circuitry, the output associated with a level-one key-pair generation entity—may include a number of alternate/additional component operations. Operation 404 depicts accepting an output of level-two encryption circuitry, the output associated with a decryption key generated by a level-one key-pair generation entity (e.g., as described herein FBI Level One DEcryption Circuitry 130 accepts from Homeland Security Level Two DEcryption Circuitry 128 a Level-Two DEcrypted-Level-One Encrypted CCD output 129 that was produced when Skynet Level-One Encryption Circuitry 110 encrypted with an encryption key (e.g., Cyberdine-Protective Services Pseudo-Public Encryption Key) the paired decryption key of which was generated by a level-one key-pair generation entity (e.g., Cyberdine Protective Services, an entity that legally owns/administrates Cyberdine-Protective-Services Key-Pair Generation Automation 114)); as also described herein, Cyberdine-Protective-Services Key-Pair Generation Automation 114 creates a pseudo-public-private key pair, where the pseudo-public key is delivered to Skynet Level One Encryption Circuitry 110 and where the corresponding pseudo-private key is delivered to FBI Level One DEcryption Circuitry 130 (in one instance the encryption key itself functions analogous to, or in some instances as, a Cyberdine-Protective Services Unique Key-Pair Designator in that FBI Level One DEcryption Circuitry 130 finds the corresponding decryption key (e.g., Cyberdine-Protective Services Pseudo-Private Decryption Key) by trying the keys on its keychain until a practicably useable decryption occurs (e.g., such as one of several clear text strings, either in the output itself or as might have been appended by Skynet Level One Encryption Circuitry 110 to CCD output 112 before such is encrypted into Level-One Encrypted CCD Output 118 by Skynet Level One Encryption Circuitry 110, which will subsequently allow FBI Level One Decryption Circuitry 130 to determine that it has used the right key to decrypt (e.g., such as by the present/appended plain text string being recognized after the level one decryption (also, in other implementations, a hash of the string to-be-encrypted by level one encryption circuitry is applied prior to level one encryption and the decryption automation calculates a like hash upon decryption to determine if the right decryption key has been used (the right key being that which correctly unlocks the encryption such that the correct/recognizable hash is generated when the hashing function is run upon the decrypted string))). Operation 406 illustrates that operation 402—accepting an output of level-two encryption circuitry, the output associated with a level-one key-pair generation entity—may include a number of alternate/additional component operations. Operation 406 depicts accepting an output of level-two encryption circuitry, the output associated with a key-pair designator generated by a level-one key-pair generation entity (e.g., as described herein FBI Level One DEcryption Circuitry 130 accepts Level-Two DEcrypted-Level-One Encrypted CCD output 129 that was produced when Skynet Level-One Encryption Circuitry 110 encrypted with an encryption key (e.g., Cyberdine-Protective Services Pseudo-Public Encryption Key) the paired decryption key of which was generated by a level-one key-pair generation entity (e.g., Cyberdine Protective Services, an entity that legally owns/administrates Cyberdine-Protective-Services Key-Pair Generation Automation 114); as also described herein, Cyberdine-Protective-Services Key-Pair Generation Automation 114 creates a pseudo-public-private key pair, where the pseudo-public key is delivered—along with a Cyberdine-Protective-Services Unique Key-Pair Designator—to Skynet Level One Encryption Circuitry 110 and where the corresponding pseudo-private key and unique key-pair designator is delivered to FBI Level One DEcryption circuitry 130 (in one instance FBI Level One DEcryption circuitry 130 finds the corresponding decryption key via use of a received unique key-pair designator (e.g., Cyberdine-Protective-Services Unique Key-Pair Designator as described herein))).

Other operations of FIG. 4 depict other system/operational descriptions of implementations as described herein.

Referring now to FIG. 5, FIG. 2, FIG. 9, and FIG. 1, such figures illustrate system/operational descriptions of implementations. FIG. 5 shows that operation 204—decrypting at least a part of the level-one encrypted output of the surveillance device with a level-one decryption key that is practicably inaccessible by a level-one encryption entity—may include a number of alternate/additional component operations. Operation 500 depicts receiving the level-one decryption key inaccessible by a level-one encryption entity from a level-one key-pair generation entity (e.g., Level-One Key Pair Designator Reception Circuitry E108 receives a DEcryption key (e.g., Cyberdine-Protective-Services Pseudo-Public DEcryption Key E102) inaccessible by Skynet Level One Encryption Circuitry 110, from Cyberdine-Protective-Services Key-Pair Generation Automation 114, where the Cyberdine-Protective-Services Key-Pair Generation Automation 114 is such that the decryption key that would pair with the encryption that was used by Skynet Level One Encryption Circuitry 110 to produce Level-One Encrypted CCD Output 118 is isolated (e.g., by hardware arranged such that only encryption keys may be transmitted out to Skynet Level One Encryption Circuitry 110 (e.g., only encryption bits have lines that connect with the transmission automation "facing" Skynet Level One Encryption Circuitry 110 or by automation that securely partitions any decryption key before its corresponding encryption key is sent beyond the confines of Cyberdine-Protective-Services Key-Pair Generation Automation 114))).

FIG. 5 further illustrates that operation 500—receiving the level-one decryption key inaccessible by a level-one encryption entity from a level-one key-pair generation entity—may include a number of alternate/additional component operations. Operation 502 depicts receiving a level-one key pair designator from the level-one key-pair generation entity (e.g., Level-One Key Pair Designator Reception Circuitry E108 receives a decryption key (e.g., Cyberdine-Protective-Services Pseudo-Private DEcryption Key E102), where the received decryption key (e.g., a Cyberdine-Protective-Services Pseudo-Private DEcryption Key) is inaccessible by Skynet Level One Encryption Circuitry 110, along with Unique Cyberdine-Protective-Services Key-Pair Designator E110, from Cyberdine-Protective-Services Key-Pair Generation Automation 114, where the Cyberdine-Protective-Services Key-Pair Generation Automation 114 is such that the decryption key that would pair with the encryption key delivered to Skynet Level One Encryption Circuitry 110 is isolated (e.g., by hardware arranged such that only encryption keys may be transmitted out to Skynet Level One Encryption Circuitry 110 (e.g., only encryption bits have lines that connect with the transmission automation "facing" Skynet Level One Encryption Circuitry 110 or by automation that securely partitions any decryption key before its corresponding encryption key is sent beyond the confines of Cyberdine-Protective-Services Key-Pair Generation Automation 114); in one instance, Level-One Sighted Decryption Circuitry E100 of FBI Level One DEcryption Circuitry 130 uses the received Unique Cyberdine-Protective-Services Key-Pair Designator E110 to match with a like Unique Cyberdine-Protective-Services Key-Pair Designator received in a packet from Homeland Level Two Encryption Circuitry 120 to retrieve/utilize Cyberdine-Protective-Services Pseudo-Private Decryption Key E102 as the right key to use for decrypting that which was encrypted with the Cyberdine-Protective-Services Pseudo-Public Encryption Key that was used to create Level One Encrypted CCD Output 118)).

Other operations of FIG. 5 depict other system/operational descriptions of implementations as described herein.

Referring now to FIG. 6, FIG. 2, FIG. 9, and FIG. 1, such figures illustrate system/operational descriptions of implementations. FIG. 6 shows that operation 204—decrypting at least a part of the level-one encrypted output of the surveillance device with a level-one decryption key that is practicably inaccessible by a level-one encryption entity—may include a number of alternate/additional component operations. Operation 600 depicts receiving a level-one key pair designator from a level-one key-pair generation entity in a form of a level-one decryption key that may thereafter function as the level-one key-pair designator (e.g., Level-One Key Pair Designator Reception Circuitry E108 of FBI Level One DEcryption Circuitry 130 receiving the level one decryption key (e.g., Cyberdine-Protective-Services pseudo-private decryption key E102) itself which will thereafter be used, like trying keys on a keychain, by separate automation (e.g., FBI Level One Decryption Circuitry 130) to find the right decryption key that unlocks the encryption key (e.g., FBI Level One Decryption Circuitry 130 successively trying various decryption keys against level-two DEcrypted-Level-One Encrypted CCD output 129 until an acceptable unlocking is detected such as described herein); thus allowing the encryption key to itself function as a sort of key-pair designator (e.g., analogous as to what was described in relation to FBI Name DE-Obscuring Circuitry 136 above)). In one instance, the separate automation (e.g., Level-One Sighted Decryption Circuitry E100 of FBI Level-One DEcryption Circuitry 130) can so decrypt by recognizing plaintext that Skynet Level One Encryption Circuitry 110 appended to CCD output 112 before Skynet Level One Encryption Circuitry 110 created level-one encrypted CCD output 118; in another instance, the separate automation (e.g., FBI Level-One DEcryption Circuitry 130) can so decrypt by calculating a result of a function (e.g., a hashing function) on the to-be-encrypted data (e.g., CCD output 112), the result of such function application (e.g., a hash function run on the CCD output to-be-encrypted into level-one encrypted output) Skynet Level One Encryption Circuitry 110 appended to CCD output 112 before encrypting to level-one encrypted CCD output 118 (in this instance the function (e.g., hashing function) is either known or derivable by both level-one decryption and encryption automation and thus can be calculated by the receiving automation (e.g., FBI Level-One DEcryption Circuitry 130) each time such automation tries a key on its key chain to see if the output of the function application matches (e.g., the result of running the hashing function of a particular tried key on a key chain matches that data which is present/appended, say, as the last 8000 bits, or 80000 bits, etc. of data).

Operation 602 depicts decrypting at least a part of a level-one encrypted output of the surveillance device via combination with other information not present in the level-one encrypted output of the surveillance device (e.g., Level-One Sighted DEcryption Circuitry E100 of FBI Level One DEcryption Circuitry 130 decrypting one or more parts or sub-parts of Level-Two DEcrypted-Level-One Encrypted CCD Output 129—received from Homeland Security Level Two Decryption Circuitry 128—with a level-one decryption key (e.g., Cyberdine-Protective-Services Pseudo-Private DEcryption Key E102) which Skynet Level One Encryption Circuitry 110 has/had no practicable way of knowing such that the parts encrypted by Skynet Level One Encryption Circuitry 110 would be substantially unusable absent the corresponding level-one decryption key (e.g., the corresponding paired pseudo-private decryption key generated by Cyberdine-Protective-Services Key-Pair Generation Automation 114)).

Operation 602—decrypting at least a part of a level-one encrypted output of the surveillance device via combination with other information not present in the level-one encrypted output of the surveillance device—may include a number of alternate/additional component operations. Operation 604 depicts receiving a level-one decryption key inaccessible by a level-one encryption entity from a level-one key-pair generation entity (e.g., Level-One Key Pair Designator Reception Circuitry E108 of FBI Level One Encryption Circuitry 130 receiving from Cyberdine-Protective-Services Key-Pair Generation Automation 114 the level two decryption key (e.g., Cyberdine-Protective-Services Pseudo-Private DEcryption Key E102) which will thereafter be used, like trying keys on a keychain, by separate automation (e.g., FBI Level-One DEcryption Circuitry 130) to find the right decryption key that unlocks the encryption key; thus allowing the encryption key to itself function as a sort of key-pair designator (e.g., analogous to such as what was described in relation to FBI Name DE-Obscuring Circuitry 136 or elsewhere herein)).

Operation 604—receiving a level-one decryption key inaccessible by a level-one encryption entity from a level-one key-pair generation entity—may include a number of alternate/additional component operations. Operation 606 depicts receiving a level-one key pair designator from level-two decryption circuitry (e.g., Level-One Key Pair Designator Reception Circuitry E108 of FBI Level One DEcryption Circuitry 130 receiving from a packet from Homeland Security Level Two DEcryption Circuitry 130 having Level-Two DEcrypted-Level One Encrypted CCD Output 129—along with a unique level-one key—pair designator (e.g., unique Cyberdine-Protective-Service Key Pair Designator E110—at or around a logically subsequent time when the corresponding (but unknown to Skynet Level One Encryption Circuitry 110) decryption key (e.g., Cyberdine-Protective-Services Pseudo-Private DEcryption Key)—along with Unique Cyberdine-Protective-Services Key Pair Designator E110 is sent by Cyberdine-Protective-Services Key-Pair Generation Automation 114 to FBI Level One DEcryption Circuitry 130, the corresponding encryption key (e.g., Cyberdine-Protective-Services Pseudo-Public Encryption key) of which was used by Skynet Level One Encryption Circuitry 110 to create Level-Two Encrypted CCD Output 121)).

Operation 608 depicts receiving a level-one key pair designator from a level-one key-pair generation entity in a form of a level-one decryption key that may thereafter function as the level-one key-pair designator (e.g., Level-One Key-Pair Designator Reception Circuitry E108 of FBI Level One DEcryption Circuitry 130 receiving from Cyberdine-Protective-Services Key-Pair Generation Automation 114 the level one decryption key (e.g., Cyberdine-Protective-Services Pseudo-Private DEcryption Key E102) itself which will thereafter be used, like trying keys on a keychain, by separate automation (e.g., by Level-One Sighted Decryption Circuitry E100 of FBI Level-One DEcryption Circuitry 130) to find the right decryption key that unlocks the encryption key (e.g., the Cyberdine-Protective-Services Pseudo-Private key E102 that will unlock encryption done with the Cyberdine-Protective-Services Pseudo-Public Encryption Key); thus allowing the decryption key to itself function as a sort of key-pair designator (e.g., such as was described in relation to FBI Name DE-Obscuring Circuitry 136 above and elsewhere herein)). In one instance, the automation (e.g., FBI Level-Two DEcryption Circuitry 130) can so decrypt by recognizing plain text that Skynet Level One Encryption Circuitry 120 encrypted/appended to CCD output 112 before encrypting to Level-One Encrypted CCD Output 118; in another instance, the automation (e.g., FBI Level-One DEcryption Circuitry 140) can so decrypt by calculating a result of a function (e.g., a hashing function), which result Skynet Level One Encryption Circuitry 120 encrypted/appended to CCD Output 112 before encrypting to Level-One Encrypted CCD Output 118 (in this instance the function (e.g., hashing function) is either known or derivable by both level-one decryption and encryption automation); such appended data can be checked and re-checked as each key on the key chain is tried.

Other operations of FIG. 6 depict other system/operational descriptions of implementations as described herein.

Referring now to FIG. 7, FIG. 2, FIG. 9, and FIG. 1, such figures illustrate system/operational descriptions of implementations. FIG. 7 shows that operation 206—transmitting a plaintext output of the surveillance device—may include a number of alternate/additional component operations. Operation 700 depicts transmitting a plaintext output of the surveillance device in conjunction with a surveillance device identifier (e.g., Level-One DEcrypted Transmission Circuitry E104 of FBI Level-One DEcryption Circuitry 130 transmitting Doubly-Decrypted CCD Output 132 (e.g., DEcrypted with Cyberdine-Protective-Services Pseudo-Private DEcryption Key E102 by Level-One Sighted DEcryption Circuitry E100 of FBI Level-One DEcryption Circuitry 130), Unique Heuristic-Algorithm-Services Key Pair Designator E110, and some type of surveillance device identifier (e.g., "Skynet Security Camera Alpha") to Stream-to-Viewable-CCD Output Conversion Circuitry 134).

FIG. 7 further illustrates that operation 700 transmitting a plaintext output of the surveillance device in conjunction with a surveillance device identifier—may include a number of alternate/additional component operations. Operation 702 shows transmitting a plaintext output of the surveillance device in conjunction with an encrypted version of the surveillance device identifier (e.g., Level-One Decrypted Transmission Circuitry E104 of FBI Level One DEcryption Circuitry 130 transmitting an output that Level-One Sighted Decryption Circuitry E100 of Skynet Level One DEcryption Circuitry 130 has DEcrypted to Doubly DEcrypted CCD Output 132 with the requisite decryption key inaccessible by Skynet Level One Encryption Circuitry 110 in conjunction with an encrypted surveillance device identifier (e.g., "Encrypted-Camera-ID"—the encrypted version of "skynet security camera alpha" produced by Skynet Name Obscuring Unit 106 and received by Level-One Decrypted Transmission Circuitry E104 in conjunction with Level-Two DEcrypted-Level-One Encrypted CCD Output 129 that was also received by Level-One Decrypted Transmission Circuitry E104 from Homeland Security Level Two Decryption Circuitry 128))—may include a number of alternate/additional component operations. Operation 704 depicts receiving an encrypted version of the surveillance device identifier (e.g., Decrypted Transmission Circuitry E104 of FBI Security Level Two DEcryption Circuitry 130 receiving an encrypted identifier (e.g., "Encrypted Camera ID" from Homeland Security Level Two Decryption Circuitry 128 which itself received the encrypted identifier, through various intermediaries such as Pre-Crime Repository 122, from Skynet Name Obscuring Unit 106)).

Continuing to refer to FIG. 7, FIG. 9, and FIG. 1, such figures illustrate system/operational descriptions of implementations. FIG. 7 further shows that operation 702 transmitting a plaintext output of the surveillance device in conjunction with an encrypted version of the surveillance device identifier—may include a number of alternate/additional component operations. Operation 706 depicts receiving an encryption of at least a part of a version of the surveillance device identifier that was encrypted with a name-obscuring encryption key whose decryption key is inaccessible by a level-one encryption entity (e.g., FBI Level Two DEcryption Circuitry 130 receiving from Homeland Security Level Two DEcryption Circuitry 128 a version of "Skynet Security Camera Alpha" (e.g., "Encrypted-Camera-ID") that was encrypted with a pseudo public key generated by Camera-to-Obscure Co Circuitry 104 as described herein; as also described herein Homeland Security Level Two DEcryption Circuitry 128 has previously received the encrypted device identifier from Skynet Name Obscuring Unit 106, through various intermediaries such as Pre-Crime Repository 122, prior to transmitting the encrypted device identifier to FBI Level One DEcryption Circuitry 130). Operation 708 depicts transmitting the encryption of at least the part of the version of the surveillance device identifier in conjunction with the plaintext output of the surveillance device to name de-obscuring circuitry (e.g., Level-One DEcrypted Transmission Circuitry E104 of FBI Level Two DEcryption Circuitry 130 transmitting a part a version of a packet—containing the string "Encrypted-Camera-ID+16 Jun. 2014; Time 10:00 a.m.-11:00 a.m.", linked with at least a part of Doubly-Decrypted CCD Output—to FBI Name DE-Obscuring Circuitry 136).

Continuing to refer to FIG. 7, FIG. 2, and FIG. 1, such figures illustrate system/operational descriptions of implementations. FIG. 7 shows that operation 206—transmitting a plaintext output of the surveillance device—may include a number of alternate/additional component operations. Operation 710 depicts transmitting a plaintext output of the surveillance device to presentation-related circuitry (e.g., Level-One DEcrypted Transmission Circuitry E104 of FBI Level Two DEcryption Circuitry 130 transmitting Doubly DEcrypted CCD output 132 of Camera 102 to computational presentation circuitry (e.g., to Judge Judy's Machine 166 through the intermediaries of Stream-to-Viewable CCD Output Conversion Circuitry 134 and or FBI Name DE-Obscuring Circuitry 136)).

Other operations of FIG. 7 depict other system/operational descriptions of implementations as described herein.

With reference now to FIG. 8, FIG. 2, FIG. 9, and FIG. 1, such figures illustrate system/operational descriptions of implementations. FIG. 8 shows that operation 710—transmitting a plaintext output of the surveillance device to presentation-related circuitry—may include a number of alternate/additional component operations. Operation 800 depicts transmitting a plaintext output of the surveillance device to unpresentable-to-presentable conversion circuitry (e.g., Level-One DEcrypted Transmission Circuitry E104 of FBI Level Two DEcryption Circuitry 130 transmitting Doubly DEcrypted CCD output 132 of Camera 102 to Stream-to-Viewable CCD Output Conversion Circuitry 134).

Operation 802 illustrates transmitting a plaintext output of the surveillance device to a computational device having at least one of an audio, a visual, or a tactile presentation component (e.g., Level-Two DEcrypted Transmission Circuitry D104 of Homeland Security Level Two DEcryption Circuitry 128 transmitting Level-Two DEcrypted-Level-One Encrypted CCD output 129 of Camera 102 to level-one decryption circuitry (e.g., Level-One DEcrypted Transmission Circuitry E104 of FBI Level Two DEcryption Circuitry 130 transmitting Doubly DEcrypted CCD output 132 of Camera 102 to computational presentation circuitry (e.g., a computer monitor/speakers of Judge Judy's Machine 166 through the intermediaries of Stream-to-Viewable CCD Output Conversion Circuitry 134 and or FBI Name DE-Obscuring Circuitry 136)). Other operations of FIG. 8 depict other system/operational descriptions of implementations as described herein.

IV. Implementations May be Context Dependent

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

V. Tools Allowing Automated/Mechanical Transition from Higher Level Instructions to Circuitry and/or Direct Circuitry Implementations In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operation described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, Verizon, AT&T, etc.), or (g) a wired/wireless services entity (e.g., Sprint, AT&T, Verizon, etc.), etc.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:
1. A method comprising:
receiving a level-one encrypted output of a surveillance device;
decrypting at least a part of the level-one encrypted output of the surveillance device with a level-one decryption key that is practicably inaccessible by a level-one encryption entity associated with the level-one encryption of the output of the surveillance device; and
transmitting a plaintext output of the surveillance device, the transmitting the plaintext output of the surveillance device in conjunction with a surveillance device identifier, and the transmitting the plaintext output of the surveillance device in conjunction with an encrypted version of the surveillance device identifier, wherein the transmitting the plaintext output of the surveillance device in conjunction with the encrypted version of the surveillance device identifier includes:
receiving an encryption of at least a part of a version of the surveillance device identifier that was encrypted with a name-obscuring encryption key whose decryption key is inaccessible by the level-one encryption entity, the name-obscuring encryption key being a different encryption key from a level-one encryption key used to encrypt the output of the surveillance device in order to generate the level-one encrypted output of the surveillance device; and transmitting the encryption of at least the part of the version of the surveillance device identifier in conjunction with the plaintext output of the surveillance device to name de-obscuring circuitry.

2. The method of claim 1, wherein receiving a level-one encrypted output of a surveillance device comprises:
accepting an output of level-two decryption circuitry.

3. The method of claim 1, wherein receiving a level-one encrypted output of a surveillance device comprises:
accepting a level-one encrypted version of an output of at least one of an image surveillance device, an audio surveillance device, a motion surveillance device, or a tactile surveillance device.

4. The method of claim 1, wherein receiving a level-one encrypted output of a surveillance device comprises:
accepting the level-one encrypted output of the surveillance device in a form such that the level-one encrypted output of the surveillance device is substantially unusable absent combination with other information not present in the level-one encrypted output of the surveillance device.

5. The method of claim 4, wherein accepting the level-one encrypted output of the surveillance device in a form such that the level-one encrypted output of the surveillance device is substantially unusable absent combination with other information not present in the level-one encrypted output of the surveillance device comprises:
accepting an output of level-two encryption circuitry, the output associated with a level-one encryption which cannot practicably be decrypted by a level-one encryption entity.

6. The method of claim 5, wherein accepting an output of level-two encryption circuitry, the output associated with a level-one encryption which cannot practicably be decrypted by a level-one encryption entity comprises:
accepting an output of level-two encryption circuitry, the output associated with a level-one key-pair generation entity.

7. The method of claim 6, wherein accepting an output of level-two encryption circuitry, the output associated with a level-one key-pair generation entity comprises:
accepting an output of level-two encryption circuitry, the output associated with a decryption key generated by a level-one key-pair generation entity.

8. The method of claim 6, wherein accepting an output of level-two encryption circuitry, the output associated with a level-one key-pair generation entity comprises:
accepting an output of level-two encryption circuitry, the output associated with a key-pair designator generated by a level-one key-pair generation entity.

9. The method of claim 1, wherein decrypting at least a part of the level-one encrypted output of the surveillance device with a level-one decryption key that is practicably inaccessible by a level-one encryption entity associated with the level-one encryption of the output of the surveillance device comprises:
receiving the level-one decryption key inaccessible by a level-one encryption entity from a level-one key-pair generation entity.

10. The method of claim 9, wherein receiving the level-one decryption key inaccessible by a level-one encryption entity from a level-one key-pair generation entity comprises:
receiving a level-one key pair designator from the level-one key-pair generation entity.

11. The method of claim 1, wherein decrypting at least a part of the level-one encrypted output of the surveillance device with a level-one decryption key that is practicably inaccessible by a level-one encryption entity associated with the level-one encryption of the output of the surveillance device comprises:
receiving a level-one key pair designator from a level-one key-pair generation entity in a form of a level-one decryption key that may thereafter function as the level-one key-pair designator.

12. The method of claim 1, wherein decrypting at least a part of the level-one encrypted output of the surveillance device with a level-one decryption key that is practicably inaccessible by a level-one encryption entity associated with the level-one encryption of the output of the surveillance device comprises:
decrypting at least a part of a level-one encrypted output of the surveillance device via combination with other information not present in the level-one encrypted output of the surveillance device.

13. The method of claim 12, wherein decrypting at least a part of a level-one encrypted output of the surveillance device via combination with other information not present in the level-one encrypted output of the surveillance device comprises:
receiving a level-one decryption key inaccessible by the level-one encryption entity from a level-one key-pair generation entity.

14. The method of claim 13, wherein receiving a level-one decryption key inaccessible by a level-one encryption entity from a level-one key-pair generation entity comprises:
receiving a level-one key pair designator from level-two decryption circuitry.

15. The method of claim 1 wherein transmitting a plaintext output of the surveillance device in conjunction with an encrypted version of the surveillance device identifier comprises:
receiving an encrypted version of the surveillance device identifier.

16. The method of claim 1, wherein transmitting a plaintext output of the surveillance device comprises:
transmitting a plaintext output of the surveillance device to presentation-related circuitry.

17. The method of claim 16, wherein transmitting a plaintext output of the surveillance device to presentation-related circuitry comprises:
transmitting a plaintext output of the surveillance device to unpresentable-to-presentable conversion circuitry.

18. The method of claim 16, wherein transmitting a plaintext output of the surveillance device to presentation-related circuitry comprises:
transmitting a plaintext output of the surveillance device to a computational device having at least one of an audio, a visual, or a tactile presentation component.

* * * * *